US010284389B2

(12) United States Patent
Bhattacharya et al.

(10) Patent No.: US 10,284,389 B2
(45) Date of Patent: May 7, 2019

(54) HIGH AVAILABILITY FOR DISTRIBUTED NETWORK SERVICES IN AN EXTENDED BRIDGE

(71) Applicant: ARRIS Enterprises LLC, Suwanee, GA (US)

(72) Inventors: Somen Bhattacharya, San Jose, CA (US); Rakesh Hansalia, Milpitas, CA (US); Ranganadh Muddana, Union City, CA (US); Senthil Paramasivam, Santa Clara, CA (US); Vignesh Dayabaran, San Jose, CA (US); Sai Gumudavally, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 12 days.

(21) Appl. No.: 15/331,160

(22) Filed: Oct. 21, 2016

(65) Prior Publication Data
US 2017/0118042 A1    Apr. 27, 2017

Related U.S. Application Data

(60) Provisional application No. 62/244,587, filed on Oct. 21, 2015.

(51) Int. Cl.
H04L 12/46        (2006.01)
H04L 29/06        (2006.01)
(Continued)

(52) U.S. Cl.
CPC ........ *H04L 12/462* (2013.01); *H04L 12/4625* (2013.01); *H04L 67/10* (2013.01);
(Continued)

(58) Field of Classification Search
CPC ..... H04L 12/462; H04L 67/10; H04L 67/327; H04L 69/22; H04L 49/254
See application file for complete search history.

(56) References Cited

U.S. PATENT DOCUMENTS 6,950,855 B2    9/2005    Sampathkumar
7,558,835 B1    7/2009    Shafer
(Continued)

FOREIGN PATENT DOCUMENTS

EP    2696538 A1    2/2014
WO    2017062671 A1    4/2017
WO    2017070587 A1    4/2017

OTHER PUBLICATIONS

U.S. Appl. No. 15/331,067, filed Oct. 21, 2016 by Somen Bhattacharya et al. (Unpublished.).
(Continued)

Primary Examiner — Rina C Pancholi
(74) Attorney, Agent, or Firm — Stewart M. Wiener

(57) ABSTRACT

Techniques for providing high availability for distributed network services in an extended bridge are provided. According to one embodiment, a controlling bridge (CB) of the extended bridge can detect a status change of a port extender (PE) in the bridge. The CB can further identify one or more rule contexts associated with the PE. For each rule context in the one or more rule contexts, the CB can then determine, based on the rule context, one or more packet classification rules to be programmed on the PE, and can transmit a message identifying the one or more packet classification rules to the PE.

21 Claims, 15 Drawing Sheets

(51) Int. Cl.
*H04L 29/08* (2006.01)
*H04L 12/937* (2013.01)
*H04L 12/851* (2013.01)

(52) U.S. Cl.
CPC ............ *H04L 67/327* (2013.01); *H04L 69/22* (2013.01); *H04L 47/24* (2013.01); *H04L 49/254* (2013.01)

(56) References Cited

U.S. PATENT DOCUMENTS

| | | | |
|---|---|---|---|
| 7,675,869 | B1 | 3/2010 | Anker et al. |
| 8,995,457 | B1 | 3/2015 | Dropps et al. |
| 2009/0168657 | A1* | 7/2009 | Puri .................. G06F 11/263 370/248 |
| 2014/0044129 | A1 | 2/2014 | Mentze et al. |
| 2014/0086098 | A1* | 3/2014 | Ao .......................... H04L 41/12 370/254 |
| 2014/0156906 | A1 | 6/2014 | Babu et al. |
| 2014/0181275 | A1 | 6/2014 | Lin et al. |
| 2014/0269710 | A1* | 9/2014 | Sundaram ............. H04L 45/302 370/392 |
| 2017/0085488 | A1 | 3/2017 | Bhattacharya et al. |
| 2017/0093628 | A1 | 3/2017 | Lin et al. |
| 2017/0104626 | A1 | 4/2017 | Lin et al. |
| 2017/0104665 | A1 | 4/2017 | Gowthaman |
| 2017/0104694 | A1 | 4/2017 | Lin et al. |
| 2017/0111296 | A1 | 4/2017 | Agarwal et al. |
| 2017/0118041 | A1 | 4/2017 | Bhattacharya et al. |

OTHER PUBLICATIONS

U.S. Appl. No. 15/489,395, filed Apr. 17, 2017 by Kwun-Nan Kevin Lin (Unpublished.).
Cisco Nexus 5600 Series NX-OS Layer 2 Switching Configuration Guide, Release 7.x; Mar. 15, 2014; Cisco Systems, 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
U.S. Appl. No. 15/229,012, filed Aug. 4, 2016 by Lin et al. (Unpublished.).
U.S. Appl. No. 15/243,782, filed Aug. 22, 2016 by Ramesh Gowthaman (Unpublished.).
U.S. Appl. No. 15/272,218, filed Sep. 21, 2016 by Somen Bhattacharya (Unpublished.).
U.S. Appl. No. 15/276,579, filed Sep. 26, 2016 by Kwun-Nan Kevin Lin et al. (Unpublished.).
U.S. Appl. No. 15/276,619, filed Sep. 26, 2016 by Kwun-Nan Kevin Lin et al. (Unpublished.).
U.S. Appl. No. 15/286,472, filed Oct. 5, 2016 by Bipin Agarwal et al. (Unpublished.).
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
Dell Networking Configuration Guide for the C9000 Series, Version 9.9 (0.0), Oct. 2015, 1148 pages.
U.S. Appl. No. 15/595,747, filed May 15, 2017 by Bipin Agarwal (Unpublished.).
International Search Report and Written Opinion for International Appln. No. PCT/US2016/055827 dated Jan. 25, 2017, 15 pages.
Virtual Bridged Local Area Networks—Bridge Port Extension, IEEE Computer Society, IEEE Std 802.1 BR-2012, Jul. 16, 2012, 121 pages.
Brocade FastIron Switch Port Extender, Configuration Guide, Supporting FastIron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.
NonFinal Office Action U.S. Appl. No. 15/331,067 dated Apr. 19, 2018.
International Preliminary Report on Patentability for International Appln. No. PCT/US2016/058283 dated May 3, 2018, 8 pages.

\* cited by examiner

HIGH AVAILABILITY FOR DISTRIBUTED NETWORK SERVICES IN AN EXTENDED BRIDGE

CROSS-REFERENCES TO RELATED APPLICATIONS

The present application claims the benefit and priority of U.S. Provisional Application No. 62/244,587, filed Oct. 21, 2015, entitled "Virtual Chassis with IEEE 802.1BR Port-Extension." In addition, the present application is related to commonly-owned U.S. Pat. No. 10,193,706, issued Jan. 29, 2019, entitled "DISTRIBUTED RULE PROVISIONING IN AN EXTENDED BRIDGE." The entire contents of these applications are incorporated herein by reference in their entireties for all purposes.

BACKGROUND

An IEEE 802.1BR-based network topology (referred to herein as an extended bridge) is a logical network entity that comprises two different types of units: controlling bridge (CB) units and port extender (PE) units. The CB (of which there may be one or multiple) serves as the controller of the extended bridge and is responsible for performing control plane functions (e.g., Layer 2 switching, Layer 3 routing, etc.) with respect to network traffic passing through the bridge. In contrast the PEs, which connect to the CB and to devices/hosts external to the extended bridge, act as non-intelligent devices and thus generally do not perform any local switching or routing; instead, their primary function is to provide additional data port terminations for the CB (thereby extending the port capacity of the CB). For example, each PE may be a switch/router with X number of physical data ports, which appear as virtual data ports on the CB. Upon receiving a data packet from an external device/host on an ingress data port, the PE forwards the data packet to the CB, which processes the data packet in hardware or software to determine an appropriate egress port through which the packet should be sent out. The CB then forwards the data packet to the PE housing the egress port for transmission through that port towards the next hop destination.

PEs can connect to the CB according to a tree or chain topology, with the CB being the root of the tree/chain. The leaf-level PE nodes in the topology are known as edge PEs, and the PE nodes at intermediate connection (e.g., tree branch) points are known as transit PEs. The edge PEs provide network services to various end hosts, which may include physical machines and/or virtual machines (VMs). In some embodiments, an extended bridge may include multiple CBs that connect to each other to form a linear or ring-based core stack. In these cases, the extended bridge may include multiple PE trees/chains, each rooted under a separate CB; such a configuration is sometimes referred to as a PE forest. One CB in the core stack may be designated as the master CB of the extended bridge and act as the central point of management for the entire bridge. Other CBs in the core stack may operate in a standby or member mode.

As mentioned previously, under the IEEE 802.1BR standard, the PEs in an extended bridge generally do not perform any local switching or routing; instead, they forward all data traffic to the master CB, which processes the data traffic in hardware (via packet classification rules programmed into the CB's ternary content addressable memories (TCAMs)) and/or software in order to determine how the traffic should be handled. In some implementations which go beyond the 802.1BR standard, the master CB may distribute packet classification rules to the PEs in the extended bridge for local programming and enforcement of those rules via the TCAMs of the PEs (rather than the TCAMs of the master CB). This scheme (disclosed in U.S. patent application Ser. No. 15/331,067, filed Oct. 21, 2016, now U.S. Pat. No. 10,193,706, issued Jan. 29, 2019, entitled "DISTRIBUTED RULE PROVISIONING IN AN EXTENDED BRIDGE") allows the CB to effectively offload the handling of certain network services (e.g., security, QoS, etc.) from the CB level to the PE level.

However, one significant challenge with the distributed rule provisioning described above is ensuring that the packet classification rules at the PEs (and other non-master units, such as standby CBs) are quickly and seamlessly maintained/updated in scenarios where the status of the extended bridge topology changes (e.g., a PE is rebooted or removed, a new PE is added, a new master CB is elected, a standby CB becomes the new master CB due to a failure of the old master CB, etc.). If the rules are not properly maintained/updated in these scenarios, the clients connected to the extended bridge may experience service downtime or security gaps due to inconsistent or incomplete rule programming at the PE devices.

SUMMARY

Techniques for providing high availability for distributed network services in an extended bridge are provided. According to one embodiment, a controlling bridge (CB) of the extended bridge can detect a status change of a port extender (PE) in the bridge. The CB can further identify one or more rule contexts associated with the PE. For each rule context in the one or more rule contexts, the CB can then determine, based on the rule context, one or more packet classification rules to be programmed on the PE, and can transmit a message identifying the one or more packet classification rules to the PE.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for enabling high availability of distributed network services in an 802.1BR-based extended bridge. As used herein, a "distributed network service" is a service (pertaining to, e.g., security, QoS, etc.) whose associated packet classification rules are distributed/provisioned across the TCAMs of PEs (and other non-master CB units) in the extended bridge. With these techniques, the CBs and PEs in the extended bridge can cooperate to ensure the packet classification rules provisioned at each PE are maintained/updated in an automated, quick, and seamless fashion in response to node status and availability changes in the bridge topology.

In certain embodiments, in addition to the high availability techniques mentioned above, the CBs and PEs can also implement a distributed transaction management architecture for ensuring reliable communication of messages between bridge units, and a distributed flow control mechanism for performing congestion monitoring and message queuing at each bridge unit to avoid message loss during periods of high traffic load. These and other aspects of the present disclosure are described in further detail below.

2. Example Extended Bridge and Switch/Router Architecture

Figure 1:
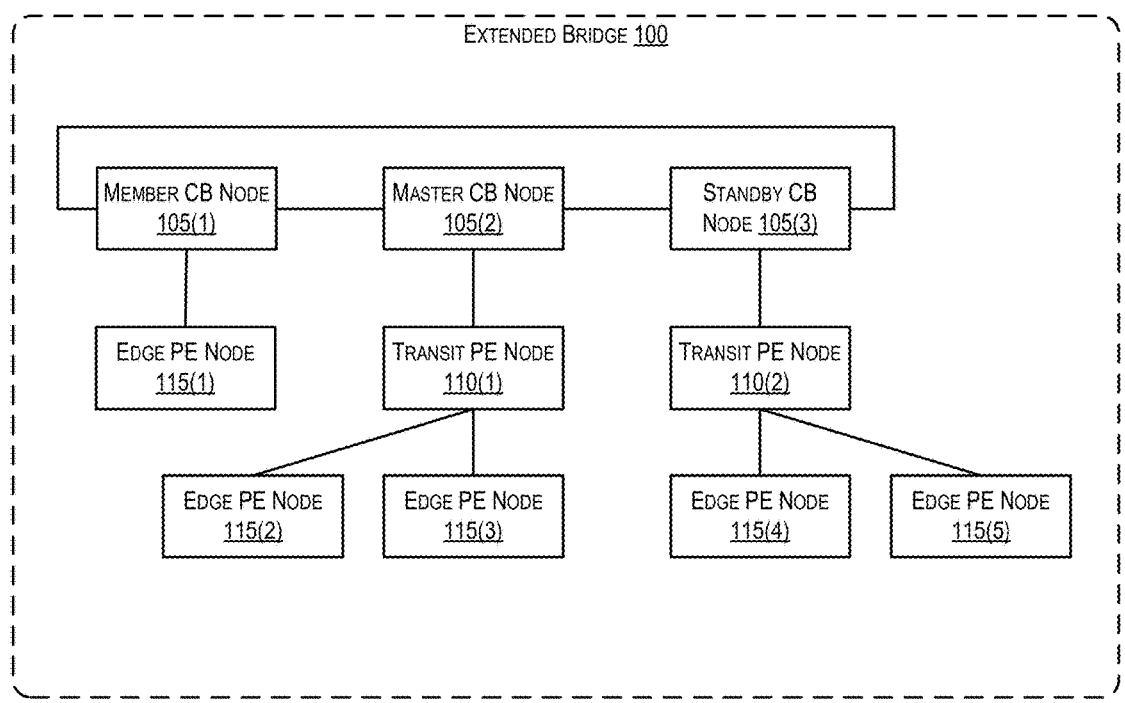
FIG. 1 depicts an example extended bridge according to an embodiment.

FIG. 1 depicts an extended bridge 100 in which embodiments of the present disclosure may be implemented. As shown, extended bridge 100 includes interconnected CBs 105(1)-(3), transit PEs 110(1)-(2), and edge PEs 115(1)-(5). CBs 105(1)-(3), transit PEs 110(1)-(2), and edge PEs 115(1)-(5) are network devices (e.g., routers and/or switches) that collectively function as a single logical router or switch per the IEEE 802.1BR bridge port extension standard. The interior links and units within extended bridge 100 form what is referred to as an extended bridge fabric. CBs 105(1)-(3) may be implemented using high-end routers or switching devices while PEs 110(1)-(2) and 115(1)-(5) may be implemented using simpler devices that are built from lower cost hardware and are less sophisticated than the CBs.

In the example of FIG. 1, CBs 105(1)-(3) are linked together according to a ring topology that represents a core stack of extended bridge 100. In addition, extended bridge 100 comprises multiple rooted PE trees (i.e., a PE forest). In particular, CB 105(1) and edge PE 115(1) form a first rooted PE tree; CB 105(2), transit PE 110(1), and edge PEs 115(2)-(3) form a second rooted PE tree; and CB 105(3), transit PE 110(2), and edge PEs 115(4)-(5) form a third rooted PE tree. Each CB at the root of a PE tree is known as a parent CB and the PE devices forming the body of each tree are known as cascaded PEs.

As mentioned previously, one CB in an extended bridge may be designated as a master CB that is responsible for controlling and managing the functional operation of the entirety of the bridge. In FIG. 1, CB node 105(2) is designated as the master CB of extended bridge 100. Master CB 105(2) may be responsible for, e.g., receiving network management commands from various network management applications (e.g., an SNMP manager, a command line interface (CLI) application, a web-based network management application, etc.) and applying and forwarding those management commands to other units of bridge 100 (e.g., transit PEs 110(1)-(2) and edge PEs 115(1)-(5)). Master CB 105(2) may also perform other functions, such as running a variety of different routing, network discovery, network management, and Layer 2 bridging protocols, performing unicast/multicast routing table and forwarding table calculations, performing traffic engineering and policing, and so on.

It should be appreciated that extended bridge 100 is illustrative and not intended to limit embodiments of the present disclosure. For example, while FIG. 1 shows CB 105(2) as the designated master CB, any of CBs 105(1)-(3) may be configured to perform the operations described above with respect to master CB 105(2). Thus, any of CBs 105(1)-(3) may serve as the master CB of extended bridge 100. For instance, CB 105(3) (which is designated as a standby CB) may switch to operate as the master CB of extended bridge 100 in the event that CB 105(2) fails.

As another example, although FIG. 1 depicts a particular number of CBs (3), transit PEs (2), and edge PEs (5), any number of CB nodes, transit PE nodes, and edge PE nodes may be supported.

As yet another example, while FIG. 1 shows these units as being interconnected according to a particular topology, the embodiments described herein may be applied to extended bridges having any other type of topology. One of ordinary skill in the art will recognize many variations, modifications, and alternatives.

Figure 2:
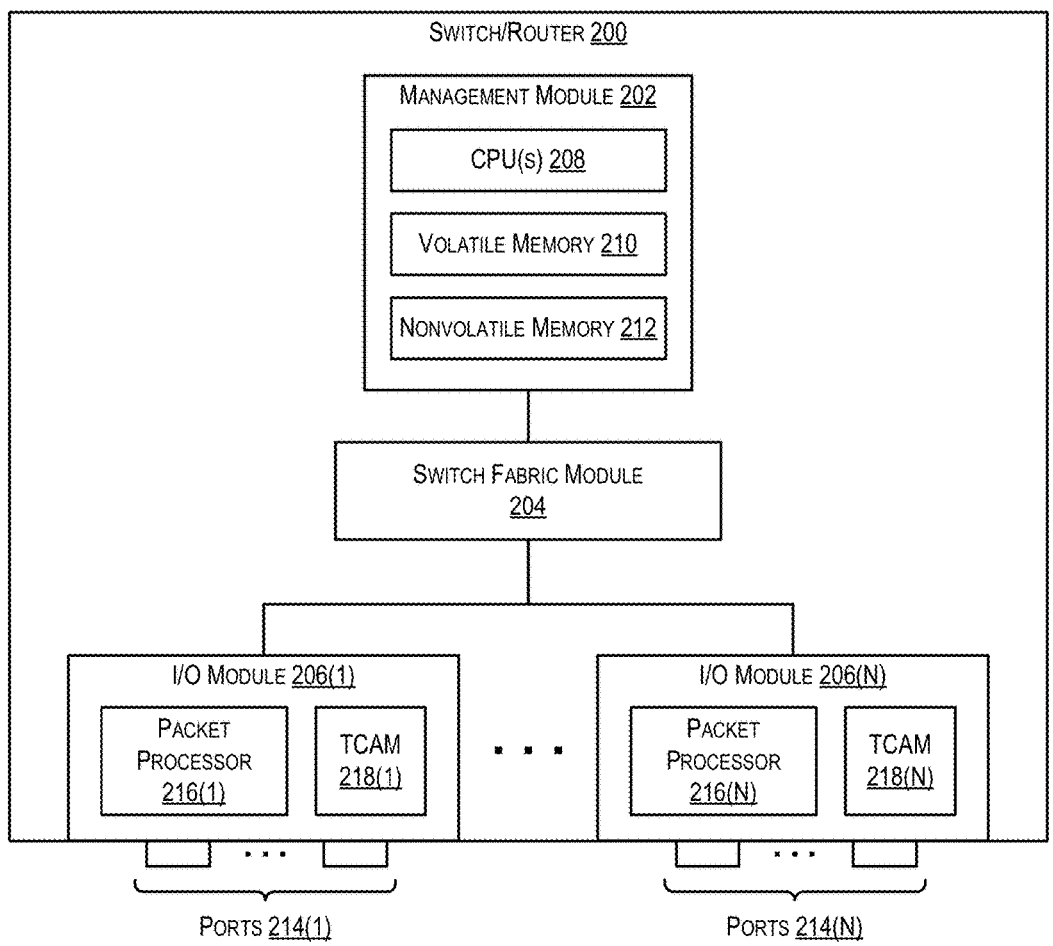
FIG. 2 depicts an example switch/router architecture according to an embodiment.

FIG. 2 depicts the architecture of an example switch/router 200 that may be used to implement the CBs or PEs of FIG. 1 according to an embodiment. As shown in FIG. 2, switch/router 200 comprises a management module 202, a switch fabric module 204, and one or more I/O modules 206(1)-(N). Management module 202 includes one or more management CPUs 208 for managing and controlling the operation of switch/router 200. Each management CPU 208 can be a general purpose processor, such as a PowerPC, Intel, AMD, or ARM-based processor, that operates under the control of software stored in an associated volatile memory (e.g., RAM) 210 and/or nonvolatile memory (e.g., ROM, flash memory, etc.) 212.

Switch fabric module 204 and I/O module(s) 206(1)-(N) collectively represent the data, or forwarding, plane of switch/router 200. Switch fabric module 204 is configured to interconnect the various other modules of switch/router 200. Each I/O module 206(1)-(N) includes one or more ports 214(1)-(N) that are used by switch/router 200 to send and receive data packets to/from other networks/hosts, as well as to/from other units within extended bridge 100 of FIG. 1.

Each I/O module 206(1)-(N) also includes a packet processor 216(1)-(N) and an associated hardware rule table (e.g., TCAM) 218(1)-(N). Each TCAM is programmed with a number of packet classification rules that are used by its associated packet processor to make wire-speed decisions on how to handle/process incoming and outgoing traffic. For example, when a packet is received on a port 214(X), packet processor 216(X) can parse the header of the packet and can extract one or more header fields to form a lookup key. Packet processor 216(X) can then perform a lookup into TCAM 218(X) using the lookup key and can receive from the TCAM an index of a packet classification rule that has matched the key. Finally, packet processor 218(X) can apply an action defined in the matched rule to the incoming packet (e.g., drop, trap to CPU, update a packet counter, modify one or more packet header fields, forward to next hop, etc.).

As noted in the Background section, some extended bridge implementations which go beyond the 802.1BR standard enable the master CB to distribute, or provision, packet classification rules to the PEs in the bridge for local programming and enforcement of those rules via the TCAMs of the PEs (rather than via the CB TCAMs). This distributed rule provisioning scheme advantageously shifts the programming/enforcement of packet classification rules from the CB level to the PE level, and thus eliminates CB TCAM capacity as a bottleneck for system scaling. However, distributed rule provisioning requires a robust mechanism for ensuring that the rules programmed at the PEs are maintained and updated in an efficient and timely manner when the status of the bridge topology changes.

To address this need, the CBs and PEs of extended bridge 100 of FIG. 1 can be enhanced to support a high availability architecture for distributed network services supported by the bridge (i.e., services that are implemented via packet classification rules distributed to the PEs and other non-master units). This architecture, which can be implemented via program code that is executed by management CPU(s) 208 and/or via one or more new hardware modules (not shown), facilitates the automatic provisioning and re-provisioning of packet classification rules to each PE/non-master CB based on node status and availability changes within the bridge (e.g., addition/removal of PEs, failure of master CB, etc.). This, in turn, ensures that there is no downtime experienced by connected hosts or security gaps due to, e.g., rules not being properly propagated to active nodes in the bridge topology.

In certain embodiments, in addition to the foregoing, techniques are provided for implementing a distributed transaction manager and a distributed flow control mechanism for enabling reliable and lossless message communication between nodes in an extended bridge. These and other aspects are described in further detail in the sections that follow.

3. High Availability for Distributed Network Services
3.1 High-level Workflows

Figure 3:
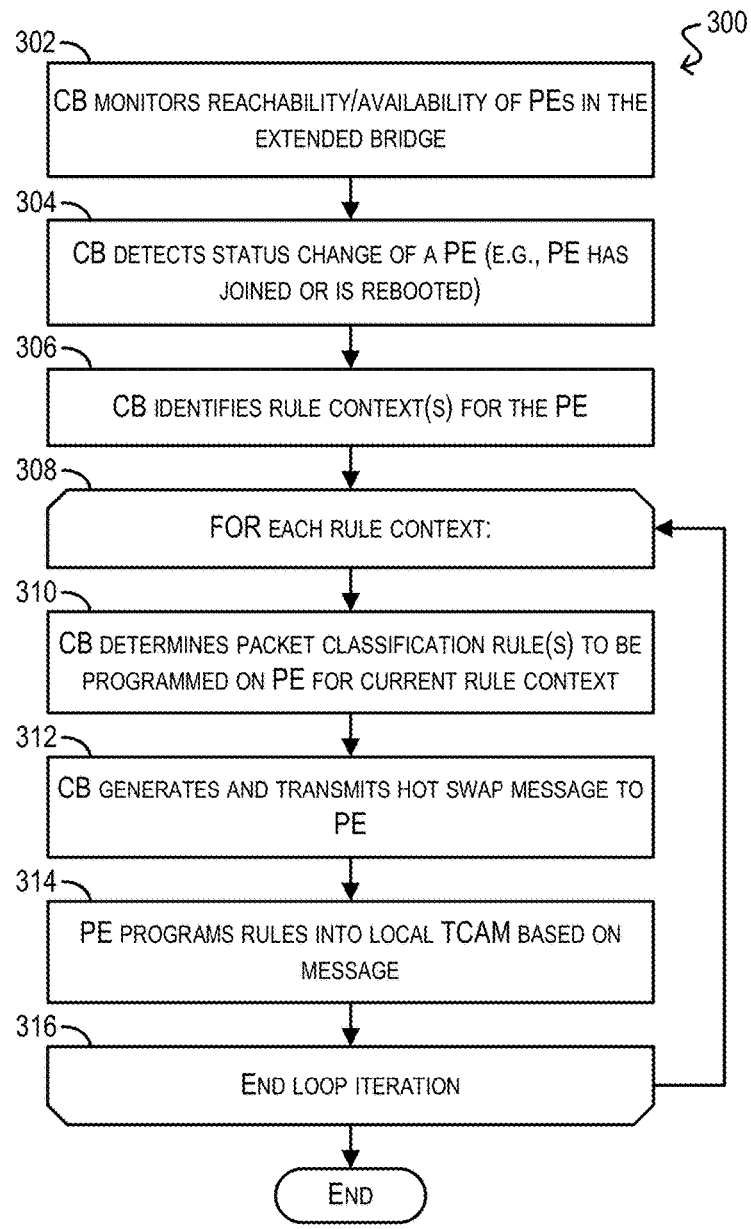
FIG. 3 depicts a high-level workflow for performing a PE hot swap session according to an embodiment.

FIG. 3 depicts a high-level workflow 300 that may be performed by switch/router 200 of FIG. 2 while acting as a master CB in an extended bridge (e.g., master CB 105(2) of FIG. 1) for automatically provisioning/re-provisioning packet classification rules to a PE in the bridge in response to a node status change according to an embodiment. Workflow 300 specifically deals with a "PE hot swap" scenario in which the PE has newly joined the bridge topology or has been rebooted in order to restart functioning in a PE operational mode.

Starting with block 302, the CB can monitor the reachability/availability of all of the PEs in the extended bridge. In one embodiment, the CB can perform this monitoring by checking the status of inter-process communication (IPC) sessions that have been established between the CB and the PEs via a distributed transaction manager (described below).

At block 304, the CB can detect a status change for a particular PE (e.g., a new PE that has joined or an existing PE that has been rebooted). In response, the CB can identify one or more packet classification rule contexts for the PE (block 306), where each rule context corresponds to a network service with one or more rules that needed to be updated/newly programmed on the PE. For example, the CB may identify one rule context pertaining to a firewalling service, another rule context pertaining to a QoS service, and so on.

At block 308, the CB can enter a loop for the identified rule contexts. Within the loop, the CB can determine the specific rules to be programmed/updated on the PE for the current rule context (block 310). In one embodiment, this rule determination can be performed by invoking a callback API that is exposed by each network protocol/service that is running on the master CB. For example, if the current rule context is for a firewalling service, block 310 can be implemented by invoking a callback API exposed by the firewalling service. Within the callback API, each network service can perform an optimized "tuple space walk" (TSW) for identifying the relevant packet classification rules to be programmed on the PE for the service. The details of this tuple space walk are discussed in Section (3.2) below.

Once the CB has determined the packet classification rules to be programmed on the PE, the CB can generate and transmit a "hot swap" message with this rule information to the PE (block 312). In response, the PE can program the rules into its local TCAM(s) (block 314).

The current loop iteration can then end (block 316) and the CB can return to block 308 in order to loop through the remaining rule contexts. Once all of the rule contexts have been processed, the workflow can terminate.

It should be appreciated that workflow 300 of FIG. 3 is illustrative and various modifications are possible. For example, while workflow 300 describes a "push" based model in which updated/new packet classification rules are pushed from the master CB to PEs in response to a node status change, a "pull" based model is also possible. In such a pull model, the newly joined or rebooted PE may actively identify and request certain rules from the master CB for local programming on the PE.

As another example, although workflow 300 depicts the master CB as performing one PE hot swap process at a time, in certain embodiments the master CB may execute multiple PE hot swap processes (i.e., multiple instances of workflow 300) in parallel, up to the maximum number of PE members supported by the extended bridge.

As another example, in some embodiments the master CB may sort the rule contexts identified at block 306 before entering the loop starting at block 308. This sorting may be required if, e.g., there are certain interdependencies between rules in the various rule contexts that require one rule context to be applied before another.

As yet another example, although not shown in workflow 300, in some cases a request to add a new rule (or delete an existing rule) may be received from a user via, e.g., the master CB command line interface (CLI) while one or more PE hot swap sessions are in progress. In these cases, the add/delete rule request should generally be sent to the affected PEs via the same communication channel used to the send the hot swap messages (in a FIFO order), rather than via a separate, asynchronous rule distribution channel. This can avoid problematic situations where the add/delete request reaches the PE before the hot swap process is completed.

For instance, assume a user submits a request to delete rule A from PE 1 while a hot swap session is in progress that involves programming/updating rule A on PE 1. If the delete request is received by PE 1 before rule A is actually programmed into the PE's TCAM via the hot swap process, the delete command will be ignored (since rule A does not exist yet). Rule A will then be programmed into the PE's TCAM as part of the hot swap, resulting in an unwanted/unexpected rule in the PE TCAM at the conclusion of the process.

One of ordinary skill in the art will recognize other variations, modifications, and alternatives.

Figure 4:
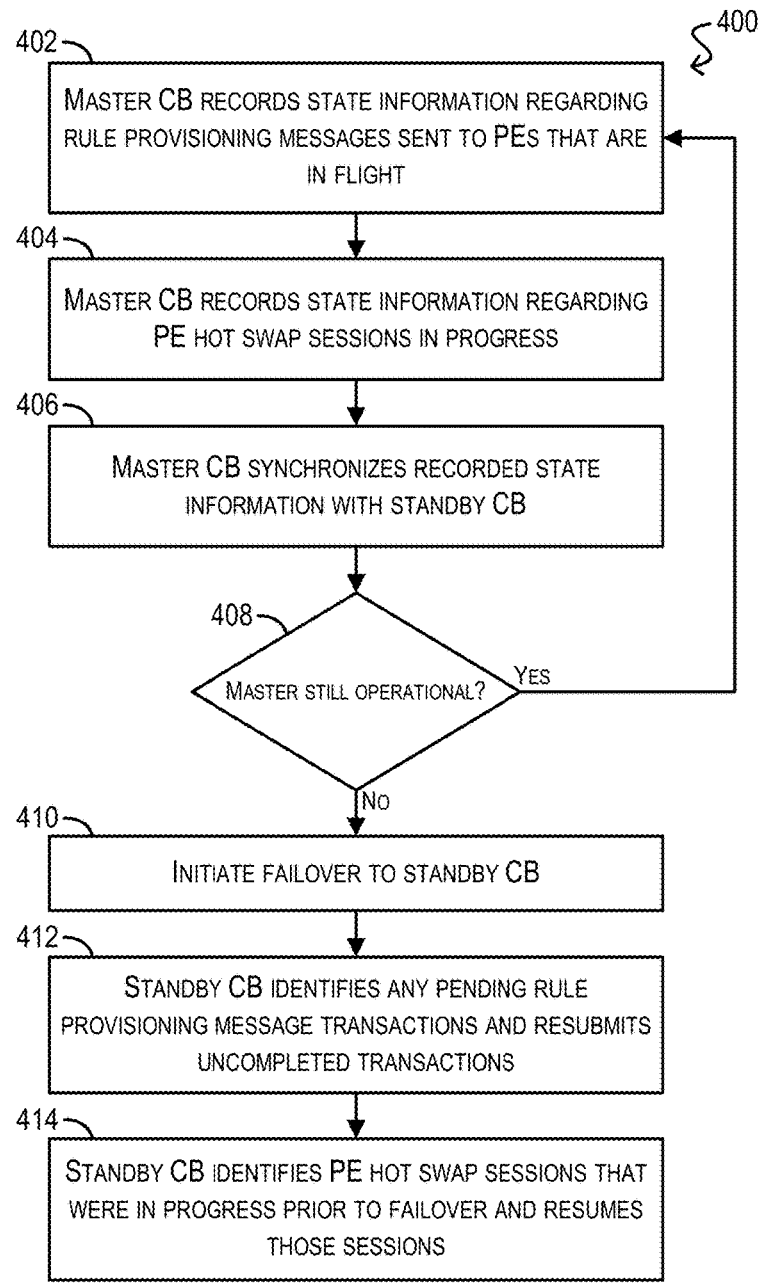
FIG. 4 depicts a high-level workflow for synchronizing state information from a master CB to a standby CB according to an embodiment.

In addition to the PE hot swap scenario described with respect to FIG. 3, another type of node status/availability change that may occur in an extended bridge is a failure of the master CB. If the master CB was in the process of provisioning packet classification rules to other nodes (or in the process of executing one or more PE hot swap sessions) at the time of the failure, state information regarding these rule provisioning processes should be synchronized to the standby CB so that the standby CB can take over and complete these processes in a consistent fashion once it assumes the role of new master CB. FIG. 4 depicts a high-level workflow 400 that illustrates this failover synchronization according to an embodiment.

Starting with block 402, the master CB can, on a periodic basis, record state information regarding rule provisioning messages sent to PEs that are "in flight" (i.e., have not been confirmed as being delivered to the PEs by, e.g., the distributed transaction manager).

At block 404, the master CB can also record state information regarding PE hot swap sessions that are in progress. This information can include, e.g., the rule contexts for each session.

Then, at block 406, the master CB can transmit the state information recorded at blocks 402 and 404 to a standby CB, thereby synchronizing the standby CB with this information. Blocks 402-406 can be performed on a continuous basis while the master CB is operational.

If the master CB fails or otherwise becomes unable to carry out its duties (block 408), a failover can be initiated from the master CB to the standby CB (block 410).

As part of this process, the standby CB (i.e., new master CB) can perform various activities to recover the state of the previous master CB (as recorded above). For example, at block 412, the standby CB can identify any pending rule provisioning message transactions and, for those that were not completed prior to the failover, resubmit those transactions to the transaction manager. In addition, at block 414, the standby CB can identify the PE hot swap sessions that were not completed prior to the failover and can resume those sessions (by, e.g., triggering the tuple space walk for each rule context associated with the session). Once blocks 410-414 are completed, the standby CB can operate as the new master CB.

3.2 Implementation Details

The following sub-sections discuss various low-level details and workflows that may be used to implement the high availability architecture described above. In these sub-sections, references to "ACLs" or "ACL rules" are intended to refer to "packet classification rules" as used elsewhere in this disclosure.

3.2.1 PE Hot Swap Process 3.2.1.1 Definitions

To describe the PE hot swap process and in particular the tuple space walk that is used to determine which packet classification rules need to be distributed to PEs, the following terms are defined from combinatorial graph theory.

3.2.1.1.1 Graph Models

A graph G=(V, E) is used for abstract representation of data in computers, in which V is termed as the vertex set consisting of vertices $\{v1, v2, v3, \ldots vn\}$ and the set E is termed as the edge set which consists of pairs of vertices <vi, vj> representing edges (eij).

A walk 'W(n)' of length 'n' in the graph G with initial vertex 'v0' and terminal vertex 'vn', is a sequence of vertices $\{v0, \ldots vi, vj, \ldots vn\}$ such that for i=0, 1, 2, . . . (n−1) the edge {vi, vj} belongs to E.

A walk 'W(n)' is a path if it contains no loop, i.e. for every i, $v(i-1) \neq v(i+1)$.

A graph is connected if for every pair of vertices {vm, vn} there exists a path.

3.2.1.1.2 Tuple Space Models

Let 'S' be any set containing numbers [real or integer], ASCII strings and characters. Then $P(n)=S \times S \times S \times S \ldots \times S$ is the product space of n-dimension.

A tuple space T(n) is a sub-set of P(n), in which every vector $X(n)=\{x1, x2, x3, \ldots xn\}$ is referred as a n-tuple, representing a point in the n-dimensional space P(n).

Assume $X(n)=\{x1, x2, x3, \ldots xn\}$ and $Y(n)=\{y1, y2, y3, \ldots yn\}$ are two tuples in the tuple space T(n). The tuples X(n) and Y(n) are called adjacent or neighbors in the n-dimensional space P(n) if and only if there exists a number 'k' such that xi=yi for all i≠k, but xk and yk are adjacent in 'S'.

EXAMPLES

Global MAC filters are identified by a unique Filter-ID parameter, which consists of a 1-dimensional tuple space.

Port attached MAC filters require a 2-tuple <PORT_ID, Filter-ID> to represent the port bound filter configuration space.

ACL entities which are bound on a per-port and per-VLAN basis would be represented in the 3-dimensional tuple space using 3-tuples <PORT-ID, VLAN-ID, Filter-Entity-Key>.

3.2.1.1.3 Constrained Tuple Space Walk

A hypergraph G(n)=<V(n), E(n)> is defined in the n-dimensional tuple space T(n), with V(n) as the vertex set consisting of n-tuples $\{<x1, x2, x3, \ldots xn>, <y1, y2, y3, \ldots yn>, \ldots <z1, z2, z3, \ldots Zb>\}$ as vertices and pairs of n-tuples $\{<x1, x2, x3, \ldots xn>, <y1, y2, y3, \ldots Yn>\}$ which represent edges.

Similarly a walk W(n) in the hypergraph G(n), i.e. in n-dimensional tuple space T(n) is defined between a start vertex tuple $u(n)=<u1, u2, u3, \ldots un>$ and a terminating vertex tuple $v(n)=<v1, v2, v3, \ldots vn>$ as a sequence of edges $e(i,j)=\{r(n), s(n)\}$, $1<=i<j<=M$, such that $r(n)=<r1, r2, r3, \ldots rn>$ and $s(n)=<s1, s2, s3, \ldots sn>$ are adjacent in the sense of n-dimensional tuple space.

A constrained walk CW(n) in the hypergraph G(n) (i.e., in n-dimensional tuple space T(n)) is defined with a set of constraints $L(q)=\{c1, c2, c3, \ldots cq\}$ between a start vertex tuple $u(n)=<u1, u2, u3, \ldots un>$ and a terminating vertex tuple v(n)=<v1, v2, v3, . . . vn> which is the walk W(n) defined above, from which the edges that do not satisfy the constraints set L(q) fully, are removed.

A constrained walk in a hypergraph may be empty when there are no edges in the hypergraph that satisfy all the required constraints.

EXAMPLES

Thus finding MAC Filters from the global filter table would translate into traversing the Filter-ID key space linearly, which is a walk in 1-dimensional tuple space.

However finding port attached MAC filters would mean a walk in the 2-tuple <PORT_ID, Filter-ID> space.

A constrained walk in the port-bound MAC filters space would mean a walk in the 2-tuple <PORT_ID, Filter-ID> with constraints={Valid PE-Port=TRUE, Port-Stack-ID=Rebooted-PE-ID, Filter-ID=Valid, Filter-Port-Attachment=PE-Port}.

Similarly finding ACL entities which are bound on a per-port and per-VLAN basis would mean a walk in the 3-dimensional tuple space of 3-tuples <PORT-ID, VLAN-ID, Filter-Entity-Key>.

A walk of port-bound MAC filters space would produce no results if no MAC filters have been attached by configuration to any of the ports of the rebooted PE unit.

3.2.1.1.4 Tuple Space Dimensionality Reduction

Dimensionality reduction is the process of mapping a higher dimensional tuple space 'T(n)' into an equivalent lower dimensional tuple space 'R(m)', if there exists a map F: T→R, such that for every tuple element t(n)=<t1, t2, t3, . . . tn> it's possible to find another tuple element r(m)=<r1, r2, r3, . . . rm>, where r(m)=F[t(n)], m<n.

EXAMPLES

Finding port-Bound IPv4 ACL rules require a constrained walk in the 9-tuple <IPv4-Src-Addr, IPv4-Src-Mask, IPv4-Dest-Addr, IPv4-Dest-Mask, Src-TCP/UDP-Port-Num, Src-TCP/UDP-Port-Mask, Dst-TCP/UDP-Port-Num, Dst-TCP/UDP-Port-Mask, PE-Port-ID> space, which would be computationally expensive.

However a more efficient way of performing this walk is via dimensionality reduction, i.e. to map the 9-tuple into a 1-tuple for walk purposes, by assigning a unique ACL ID for entry. Thus a walk in the 9-tuple space reduces to equivalent 1-tuple (ACL-ID) linear traversal.

3.2.1.1.5 Hot Swap Configuration Download Via Tuple Space Walk

Consider an extended bridge containing 'M' different types of ACL configurations, where each type of configuration is represented as a tuple space T(Nj) of dimension Nj, $1<=j<=m$. The hypergraph(s) of these tuple spaces could be represented as G(Nj)=<V(Nj), E(Nj)> defined on the tuple spaces T(Nj), respectively.

Since each of these ACL configurations would be finite in number, it is possible to complete a walk over the hypergraph(s) of the individual tuple space(s). Also the different type of ACL configurations may have inter-dependencies, so these tuple spaces should be ordered by dependencies or precedence.

Thus a totality of all the ACL configurations would be a disjoint collection of the tuple spaces in a pre-defined order, i.e. ALL_CONFIG:={T(N1), T(N2), T(N3), . . . , T(Nm)}.

In order to constitute a hot swap download configuration, a constrained walk should be performed across each of the tuple spaces T(Nj), $1<=j<=m$, in succession in a pre-defined order. When it's possible to group the tuple spaces into independent sub-sets (e.g., S(k)={T(Nk1), T(Nk2) . . . T(Nkp)}, $1<=k<=q$, such that the sub-sets are independent of each other), a more time-optimal PE hot swap configuration download can be constructed by performing parallel tuple space walks across subsets S(D1), S(D2), S(D3), . . . S(Dn).

However within any single subset S(Dj), the member tuple spaces will have dependencies, and thus those tuple spaces should be walked (i.e., traversed) in their order of dependencies or precedence.

Note that, for hot swap download purposes, the individual tuple spaces should be sorted for easy identification of not-yet-walked or walked-over tuples, in order to handle addition or deletions of tuples via CLI, SNMP or Open-Flow during on-going hot swap walks.

The primary constraints for a walk on any of the tuple spaces during a PE hot swap process is that only those tuples which are valid for that PE-ID are to be walked for downloading to the hot-swapped PE.

3.2.1.2 PE Hot Swap Services Design

For hot swap purposes, ACL configuration parameters (e.g., packet classification rules) can be downloaded from the master CB to any newly rebooted PE either using a PUSH model or PULL model.

To keep the PE's software design relatively less complex, the intelligence of rule downloading during hot swap can reside on the master CB and the download process can follow a PUSH model. In other words the master CB, at its own discretion, can control and drive the rule distributions to the rebooted PE(s).

To avoid redundant implementation across various network services (also referred to herein as "ACL features"), the PE hot swap process can be orchestrated using a generic PE hot swap services manager (ACL-PEHS-MGR) as a common core service framework The ACL-PEHS-MGR, which is designed to play the role of a PE hot swap controller, can function in close coordination with existing and future ACL features (i.e., network services) that may require PE hot swap services.

3.2.1.3 Services Provided by ACL-PEHS-MGR

In various embodiments, the ACL-PEHS-MGR can perform the following:

Facilitate dynamic registration of PE-HS tuple space walk callbacks.

Monitor PE up/down and REL-IPC connection up/down indications to start/stop the PE hot swap process.

Listen for PE hot swap requests from destination PE devices after a REL-IPC connect/reconnect.

Trigger tuple space walk callback(s) for ACL features in a pre-defined order.

Remember the tuple space walk context returned from an ACL feature's walk callback API.

Listen for PE-HS transaction delivery response via GEN-DIST-Framework to trigger PE-HS walk callback for the next saved tuple space context.

Terminate tuple space walk for a PE destination when the last distributed tuple's response is received.

Manage multiple PE hot swap sessions in parallel up to the maximum number of PE members.

Figure 5:
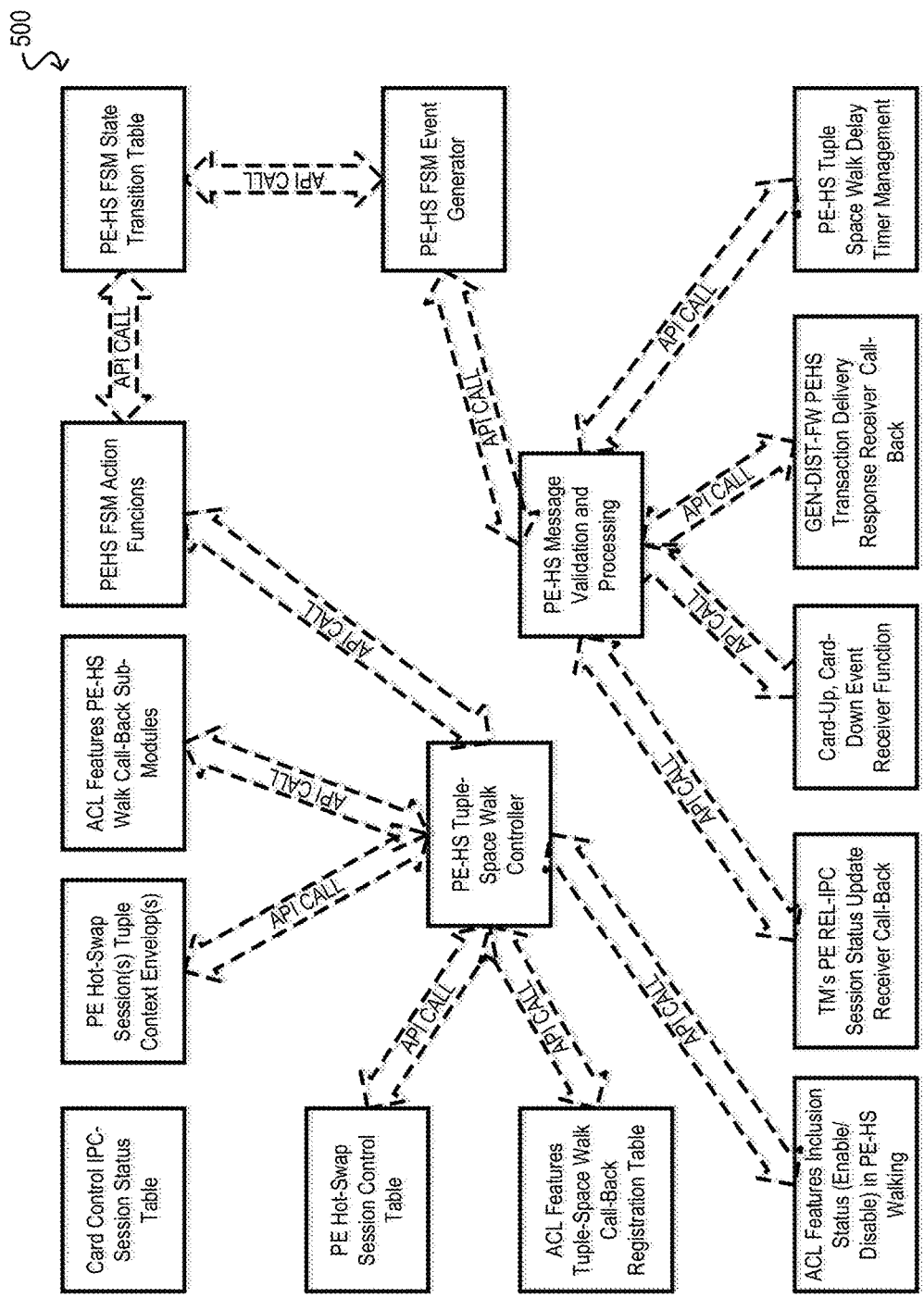
FIG. 5 depicts functional components of a PE hot swap manager according to an embodiment.

FIG. 5 depicts a diagram 500 of the functional components of the ACL-PEHS-MGR according to an embodiment.

3.2.1.3.1 PE Topology Discovery and Status Monitoring

The ACL-PEHS-MGR can intercept the received card-up and card-down SCP events inside the callback functions for those event handlers for the ACL task.

Based on these events, the card-control table entries of ACL-PEHS-MGR can be updated to reflect the card's (i.e., PE's) state. A PEHS-MGR-FSM component is run with these events as inputs to drive a finite state automaton (FSM) to complete the processing of a card status change.

Card-UP Event—A PEHS-session control block is allocated and initialized with default values for the parameters. The FSM advances to the state for waiting on PE reachability status monitoring, i.e., wait for reception of REL-IPC connection establishment status from a transaction manager task.

Card-Down Event—All pending information regarding the PE hot swap tuple space walk in-progress etc. are discarded and the PEHS-session control block object memory is freed. The card-control table is updated to reflect the card status.

3.2.1.3.2 Port Extender Topology Reachability Monitoring

The ACL-PEHS-MGR uses the status of reliable IPC session establishment to determine the reachability of the destination PE units. A distributed transaction manager (TM) task establishes and monitors the reliable IPC sessions to each PE.

Whenever there is a session status change for any PE, the TM task relays that status change by sending an ITC message to the ACL Task. The ACL Task receives IPC-Session-Up and IPC-Session-Down status for PEs via registered ITC callback functions.

The card-control table of ACL-PEHS-MGR, which also maintains the reliable-IPC session status for each card, is updated to reflect the card's REL-IPC-Session state (also referred as PE unit reachability). The PEHS-MGR-FSM is run with these session status change notifications as inputs to advance the state of the automaton.

IPC-Session UP—The tuple space-walk context is initialized and the first tuple space that is enabled for walking and also has a registered callback is identified by searching the walk precedence table.

No walk-eligible tuple space is found—This would imply that no ACL rules need to be downloaded and the hot swap procedure for that PE is complete. The state of the PEHS-MGR-FSM is advanced to 'Await-Card-Down' state indicating hot swap completion.

A walk-eligible tuple space is found—The ACL-PEHS-MGR initializes the TSWCE block specific to the PE and invokes the registered callback API for the tuple space found.

IPC-Session Down—All pending information regarding the PE hot swap tuple space walk in-progress etc. are discarded and the PEHS-session control block object memory is freed. The card-control table is updated to reflect the card status.

3.2.1.3.3 ACL-PEHS-MGR Finite State Automaton

The ACL-PEHS-MGR's implementation contains a core component 'Hot-Swap Controller' which is responsible for handling all external events e.g. PE Node Card Up or PE Node Card Down, IPC Connection Up or IPC Connection Down, Hot-Swap Start Requests from PEs, etc. In the center of the Hot-Swap Controller there is a PEHS Finite State Automation (PEHS-FSA) which accepts all events as inputs and triggers a transition to the next state after executing some action functions.

The typical actions of PEHS-FSA are to issue Tuple-Space Walk Call-Back to the registered applications, which in turn triggers distributions of the tuple configurations as P2P transactions towards the hot-swapped remote destination.

The PEHS-FSA is also responsible for robust hot-swap operation by re-issuing the Hot-Swap Call-Back in the event of response timing out or congestion loss due to queue overflow or due to master CB Failover (i.e., standby CB becoming the new master CB after the old master CB has gone down). The Hot-Swap Controller also facilitates credit based scheduling of tuple space walk for applications, i.e. Tuple-Space Walk Call-Back is issued to applications at the master CB, provided the transaction manager's ingress queue for the pair <Destination-ID, Application-Layer-Channel-ID> is not full (in other words, the ingress queue has sufficient space to accommodate a new transaction).

3.2.1.3.4 ACL-PEHS-MGR Tuple Space Registered Callbacks

The ACL-PEHS-MGR facilitates hot swap download of configurations by traversing various tuple spaces and sending the tuples as transactions to a newly rebooted PE device or member CB device.

Since the tuple structure may be different for each tuple space, the encapsulation of a tuple into a transaction message is done in a generic manner via application specific Tuple-Space Walk Call-Back(s).

Each application that intends to utilize the hot swap download services of ACL-PEHS-Manager would register its Tuple-Space Walk Call-Back API.

3.2.1.3.5 ACL-PEHS-MGR Tuple Space Walk Context Maintenance

The ACL-PEHS-MGR maintains a generic tuple space walk context as an envelope (TSWCE) of all ACL features' context types. This walk context envelope is opaque to the PEHS-MGR and the structure of the contents are not decoded.

Since multiple PEs (up to a maximum supported number, e.g., 40) may be undergoing the hot swap procedure at any time, the ACL-PEHS-MGR maintains the TSWCE on a per PE unit basis.

When the ACL-PEHS-MGR determines that an ACL feature's tuple space walk needs to be started, the TSWCE memory block specific to that PE is zeroed-out before passing it as parameter to the feature's tuple space walk callback (TSWCB) API. This is to allow the ACL feature's walk callback implementation to distinguish between a first time invocation and a subsequent invocation of the callback.

When the ACL Feature terminates the walk and the callback returns, the ACL-PEHS-MGR saves the updated return context envelope.

3.2.1.3.6 ACL-PEHS-MGR Tuple Space Walk Controlling

In order to avoid congestion in the transaction queues of the transaction manager at the master CB, the PE-HS-Controller decides on the maximum number of tuples to be walked by a tuple space application. The PE-HS-Controller queries from the transaction manager the maximum allowed credit for the P2P transaction queue.

The queue credit is usually expressed in bytes; however each transaction message carries only a single Hot-Swap tuple parameter which is small. Thus the queue credit can be treated as proportional to the number of P2P transaction messages, and hence as number of tuples allowed to be Hot-Swap distributed as P2P transactions.

Also, if a Hot-Swap P2P transaction submission attempt to the transaction manager fails due to the ITC queue being full, then PE-HS-Controller can reset the Maximum Tuple Walk allowed count to one, and start a delay timer.

After the delay timer expiry the PE-HS-Controller cam issue a Tuple Walk Call-Back for just one tuple as the limit, to check whether or not the transaction manager's ITC queue has drained to accommodate at least one new transaction.

After a P2P transaction containing Hot-Swap tuple parameters is distributed via the transaction manager to a remote destination, if the response timer expires, the response timer may be restarted with exponential back-off. Every time the response timer expires and restarted with exponential back-off, congestion at the remote destination is implied and hence PE-HS-Controller can mark this Hot-Swap session as congestion experiencing. When a response is received from the remote destination, the Tuple Space Wall Call-Back is resumed and Max Allowed Tuple Walk count will be half of the TM's queue credit limit if a previous congestion experiencing was set. After normal responses are received without any response timer expiry for successive rounds of walk tuple distributions, the congestion experienced status of this PE Hot-Swap session will be cleared and the Maximum Allowed Tuple will then correspond to the TM's available queue credit corresponding to that hot-swapped destination.

3.2.1.4.2 Tuple Space Walking

The tuple spaces are maintained in a sorted manner, i.e. in lexicographically sorted manner. Tuple space walking consists of traversing a tuple space database in lexicographically sorted manner via a series of Get Next Tuple actions.

The applications should provide Get Next API(s) for each of their tuple space tables, so that in every cycle of Tuple-Space Walk Call-Back, the application can finish traversing of the maximum number of allowed tuples simply by issuing a sequence of Get-Next calls to the particular tuple types.

3.2.1.3.8 ACL-PEHS-MGR Hot Swap Service Completion

The tuple spaces of different applications may have interdependencies and thus the tuple configurations present at the master CB should be downloaded to a newly rebooted PE device or a member CB device in a particular order so that the interdependencies among the tuple spaces are not violated.

Since the PE-HS Controller is a generic hot swap services provider for any protocol application or system infrastructure application, in an extended bridge it is initialized with a pre-defined ordered sequence of Tuple-Space IDs across all applications that need to download hot swap configurations to a rebooted PE device or member CB device. This pre-defined ordered sequence of Tuple-Space IDs are referred in this document as OSTS-ID(s).

Thus PE-HS Controller upon detection of a newly rebooted device (either PE or member CB) triggers a series of Tuple-Space Walk Call-Back(s) to the registered applications in the same order as the OSTS-ID(s).

The PE hot swap process continues in a repeating cycle of Hot-Swap Walk Call-Back, tuple downloads via transaction distribution, and P2P transaction delivery response waiting. The PE hot swap process for a newly rebooted PE or member CB device completes when the eligible tuples of the last Tuple-Space ID in the List OSTS-ID(s) has been successfully distributed and all required responses have been received from the remote rebooted PE or member CB device.

3.2.1.3.7 ACL-PEHS-MGR Tuple Space Walk Termination

An ACL feature should continue its tuple space walk as long as there are matching tuples in the space and the walk termination conditions are not violated.

In one embodiment, an ACL Feature should terminate its tuple space walking when one or more of the following conditions are satisfied.

Maximum allowed number of tuples in a single callback invocation have been already walked.

Maximum time limit for walking [inclusive of any resulting distributions] has already been exceeded.

Tuple space end has been reached.

3.2.1.4.4 Tuple Space Walk Context Saving

When the tuple space walk call back API of a registered application is invoked by the PE-HS-Manager, the tuple space walk mechanism can traverse one or more tuples and distribute them as transactions to the hot-swapped destination device.

The Tuple space traversal can halt when either maximum number of Tuples Walking allowed is exhausted or there are no more eligible tuples in the tuple-space table or the maximum allowed time for traversal has exceeded.

Whenever tuple space walking is halted, the tuple parameter value of the last walked tuple can be saved as a walk Context in the PE-HS-Manager's internal opaque hot-swap context memory. When the PE-HS Walk Call-Back is re-issued to a registered application, the saved value of the last walked tuple context memory area is passed to that application's Walk-Call-Back. The application can then continue tuple space traversal from the next available tuple of that tuple space.

In either of these scenarios, the PE-HS-Manager can re-issue Walk-Call-Back when a response is received from the hot-swapped destination node.

3.2.1.5 Generic Distribution Framework

This framework is responsible for facilitating the distribution of access control list (ACL) configurations of the extended bridge from the master CB to PE units in the bridge topology. Such an operation is typically a configuration operation driven by a user through the master CB's CLI during normal operation, by a startup configuration process during system boot-up, or by the running configuration during a hot swap of a specific PE unit.

This distribution concept is implemented using the following main components, which are described throughout this disclosure and which are responsible for delivering functionalities that are needed for the proper handling of transactions during PE hot swap and master CB failover situations.

Transaction Manager (TM).
Generic Distribution Framework (Gen-DIST-FW).
PE Hot Swap Manager (PEHS-MGR).
Generic Hot Swap Configuration Distribution Augmentation (GHDA).
Port Extender Devices Configuration Disjoin Cleanup Manager (PEDC-MGR).
Primary & Backup Redundancy Pair State Synchronization Manager (RPSS-MGR).
Primary & Backup Baseline State Synchronization Manager (BLSS-MGR).

Together, the above components constitute an Asynchronous Distribution Framework (ADF) where transactions are processed asynchronous to the operation of the application layer features that generate the transaction requests.

The key responsibility of the Gen-DIST-FW is to facilitate the distribution of various protocols and system control configurations parameters from the protocol tasks running in the master CB to the corresponding protocol task counterparts running across the various PE devices and other member CB devices which are part of the extended bridge.

The Gen-DIST-FW architectural element prepares various protocol configuration changes originated at the master CB into transaction model objects and facilitates their distributions to PE and member CB devices by utilizing generic transaction services provided by the Distributed Transaction Manager (DTM) sub-system.

The Gen-DIST-FW provides a set of application programming interfaces (API) specifications that the application layer features can adopt in processing transactions. Typical API(s) that GEN-DIST-FW can facilitate for the client applications are allocation of a distribution request object, assigning a list of destination node's addresses, Unit IDs, whether the transaction needs to be distributed to a single destination or to a P2MP group of multiple destinations, whether or not a single consolidated response should be returned or individual responses from each of the targeted destinations should be returned, whether the transaction request is for distributing an application layer provisioning request or for distributing cancelation request against an existing pending transaction, etc.

3.2.1.6 Generic PE Hot Swap Distribution Augmentation (GHDA)

When NMS users perform configuration actions of various protocol parameters creation, deletion or modification at the same time when one or more destination PE or member CB devices are known to be rebooted but have not yet completed their hot swap download of existing configurations from the master CB, it may not always be appropriate to download the new configuration changes to the hot swap in-progress destination devices immediately due to ordering dependencies of the configuration parameters across protocol features or across system level configuration parameters. In such scenarios the distribution of newly entered configuration parameter changes is handled by a procedure termed as 'Generic Hot Swap Distribution Augmentation (GHDA)'.

Since the newly created, deleted, or modified configurations from CLI or SNMP users would get distributed to the other member CB and/or PE devices which are already hot swap download complete, the currently hot swap undergoing destination devices would miss the new configuration parameters and protocol applications on those destination devices, which may cause them to behave differently on inconsistently.

Thus to allow an alternate mechanism so that the newly created, deleted or modified configuration parameters are also eventually distributed to the current hot-swap in-progress destinations, without violating the pre-defined tuple space hot-swap distribution order, a tuple space order dependent decision mechanism can be used so that the new configuration parameters are either sent along with the P2P hot-swap distribution or those are automatically covered due to their tuple space ordering positon, as a natural course of Tuple-Space by Tuple-Space Hot-Swap distributions.

Thus where a rule creation request is received via CLI, SNMP, or Open-Flow during a PE hot swap session, ACL's regular multi-destination distribution logic should check if there are ongoing PE hot swap sessions to any of the PE destinations that would have otherwise received a copy of the distribution.

If any of those hot swapping PE(s) have walked past the insert position (decided by sorted tuple order), then a copy of the rule creation request should be en-queued to a hot swap distribution channel for those PE(s). If none of the hot swapping PE(s) have walked past the insert position yet, then continue with regular multi-destination distribution logic.

In the case where a rule deletion request is received via CLI, SNMP, or Open-Flow during PE hot swap session, ACL's regular multi-destination distribution logic should check if there are ongoing PE hot swap sessions to any of the PE destinations that would have otherwise received a copy of the distribution.

If any of those hot swapping PE(s) have walked past the delete position (decided by sorted tuple order), then a copy of the rule delete request should be en-queued to a hot swap distribution channel for those PE(s). If none of the hot swapping PE(s) have walked past the delete position yet, then continue with regular multi-destination distribution logic.

It should be noted that such rule additions or deletions should not be sent to the hot swapping PE(s) through a regular distribution channel, but only through a host swap distribution channel in FIFO order.

This is because the hot swap sessions may have many transactions waiting in the queue in the case of burst mode of transmission, and sending an add/delete or bind/unbind through a regular distribution channel may reach the PE(s) much earlier (since the regular channel will not have any burst in the queue).

Thus, a rule delete may reach a hot swapping PE before an add or bind operation for the same rule has reached, thus causing the rule delete to be ignored and resulting in an unexpected rule to be programmed at PE (due to late arrival of the hot swap walk-generated rule add or bind).

Figure 6:
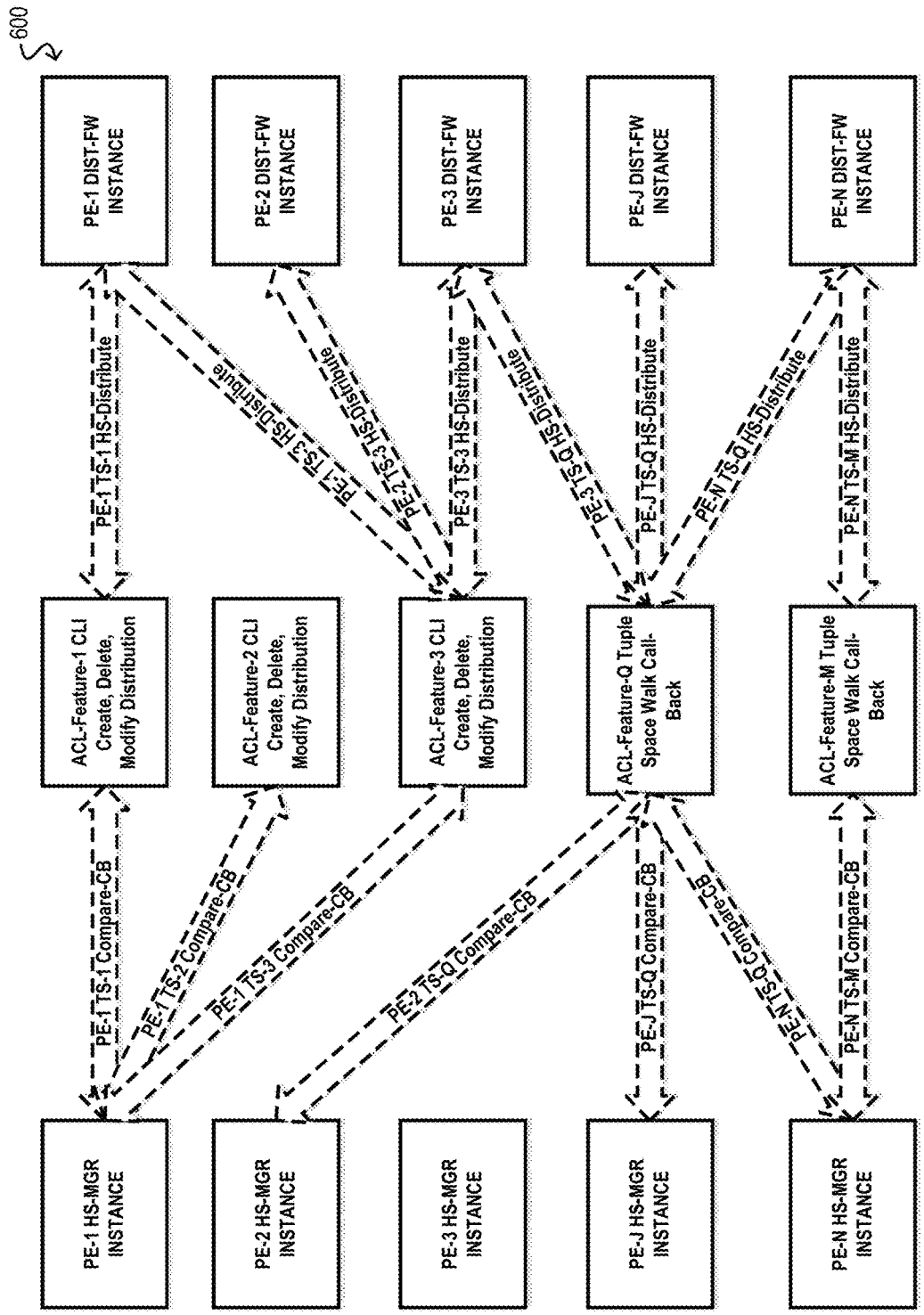
FIG. 6 depicts services that may be provided by a generic hot swap distribution augmentation manager according to an embodiment.

FIG. 6 depicts a diagram 600 of the services that may be provided by the GHDA manager according to an embodiment. This diagram shows 'N' number of simultaneous PE hot swap download sessions that are in progress. Each of the 'N' sessions is controlled by an independent instance of PE-HS-Manager 'PE-J HS-MGR Instance' which is responsible for coordinating and triggering Tuple-Space Walk Call-Back(s) for 'M' number of Access Control List (ACL) features. Each of the ACL feature Call-Back(s) in-turn walk over the tuples and select the tuples that need to be distributed to the PE devices.

Each ACL Feature Call-Back "ACL-Feature-Q Tuple Space Walk Call-Back" invokes the Hot-Swap Distribute API of GEN-DIST-FW component's instance 'PE-N DIST-FW INSTANCE' in order to send the tuple to PE Device with ID=N.

The diagram also shows tuple comparison Call-Back(s) 'PE-J TS-Q Compare-CB' invoked by the hot-swap manager instances 'PE-J HS-MGR INSTANCE' against each ACL Feature 'ACL-Feature-Q Tuple Space' to decide whether or not the currently walked tuple is lexicographically higher than the tuple being modified by a NMS user.

When the currently Walked Tuple is lexicographically higher than the tuple being modified by a NMS user, the PE-HS Walk process has already advanced beyond the order sequence position of NMS modified tuple and hence this modified tuple needs to be distributed as replicated transaction of the original modify request transaction so that the hot-swap in-progress destination devices can receive the modified tuple.

When the walked tuple is not lexicographically higher than the tuple being modified by a NMS user, no transaction replication is necessary since the modified tuple has not been walked yet and hence it will be distributed to the Hot-Swap In-Progress destination devices during the normal course of tuple space walking.

3.2.1.7 Generic PE Disjoin Cleanup Manager

The PE Disjoin Cleanup (PEDC) Manager can perform the following:

Facilitate dynamic registration of PE tuple space walk callbacks.

Monitor card up/down and up/down indications of REL-IPC tunnel connections to master CB and standby CB.

A REL-IPC tunnel group is up as long as at least one member tunnel connection is up.

When both members in the REL-IPC tunnel group are down, the tunnel group as a whole is down and PE disjoin cleanup is Triggered by the PEDC-Manager.

Trigger tuple space walk callback(s) for ACL features in a pre-defined sequence of tuple space graph walk.

Remember tuple space walk context returned from an ACL feature's walk callback.

Wait for PEDC inter-walk delay to trigger PEDC walk callback for the next saved tuple-space context.

Terminate PEDC tuple space walk at a PE destination when the last tuple's callback returns.

When the REL-IPC connection to master CB is up again, send PE hot swap request to master CB.

Figure 7:
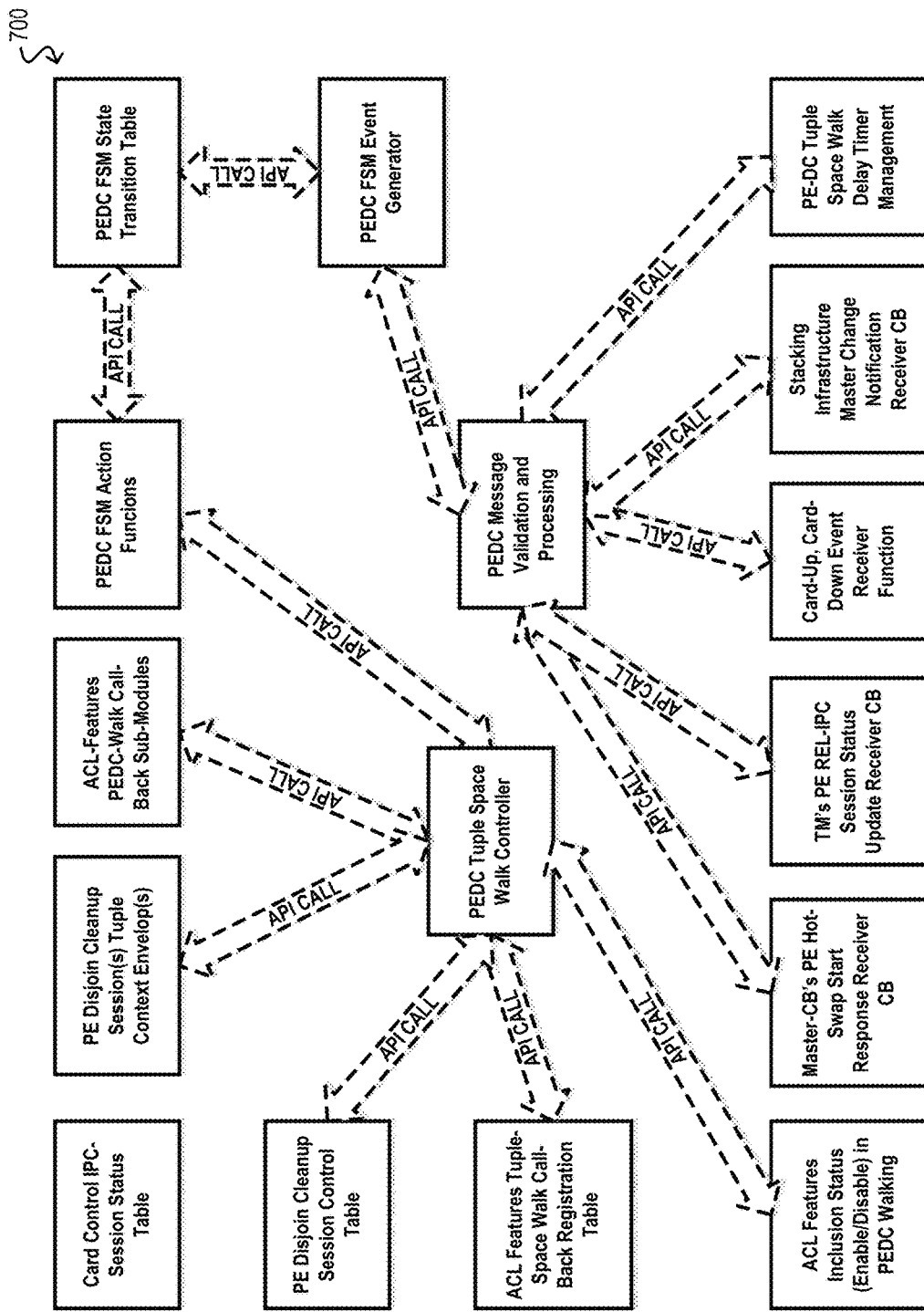
FIG. 7 depicts functional components of a PE disjoin cleanup manager according to an embodiment.

FIG. 7 depicts a diagram 700 of the functional components of the PEDC manager according to an embodiment.

3.2.2 Dynamic State Synchronization to Standby CBs 3.2.2.1 Dynamic State Persistence The following types of state information can be persisted for synchronization purposes between the master CB and standby CB:

Generic Distribution Framework's (GEN-DIST-FW) dynamic states—information pertaining to ACL distribution transaction objects created during its lifetime, until the transaction delivery completion response is received from TM ACL-PEHS-Manager's dynamic states—Information including the tuple space walk context for each PE hot swap session currently in progress.

ACL Features' dynamic states—Information including PEHS-walk context updates and pending transaction object create/delete messages propagated from master CB to standby CB via non-blocking RPSS-SYNC message exchanges.

3.2.2.2 Post-Failover Dynamic States Recovery

GEN-DIST-FW Post-Failover Dynamic States Auditing—After a failover sends an HA audit request to the transaction manager on the new master CB, the TM's audit response runs a consistency check against the pending transaction object pool for each TM Instance [Channel]. Pending Transactions that are unknown to the TM are re-submitted by GEN-DIST-FW from the new master CB.

GEN-DIST-FW Post-Failover Dynamic States Purging—Pending transaction objects which are indicated as pre-failover completed are simply purged from the pending transaction pool(s).

ACL-PEHS-Manager's Post-Failover Dynamic States Auditing—Incomplete PE hot swap sessions (i.e., those that have not completed the last tuple space walk) are resumed on the new master CB by triggering the PE-HS walk callback with the saved tuple space walk context for each such PE destination.

ACL-PEHS-Manager's Post-Failover Dynamic States Purging—Incomplete PE hot swap sessions are driven to completion if GEN-DIST-FW's pending transaction purging triggers last tuple space distribution response callback.

3.2.2.3 ACL-RPSS-Manager

Figure 8:
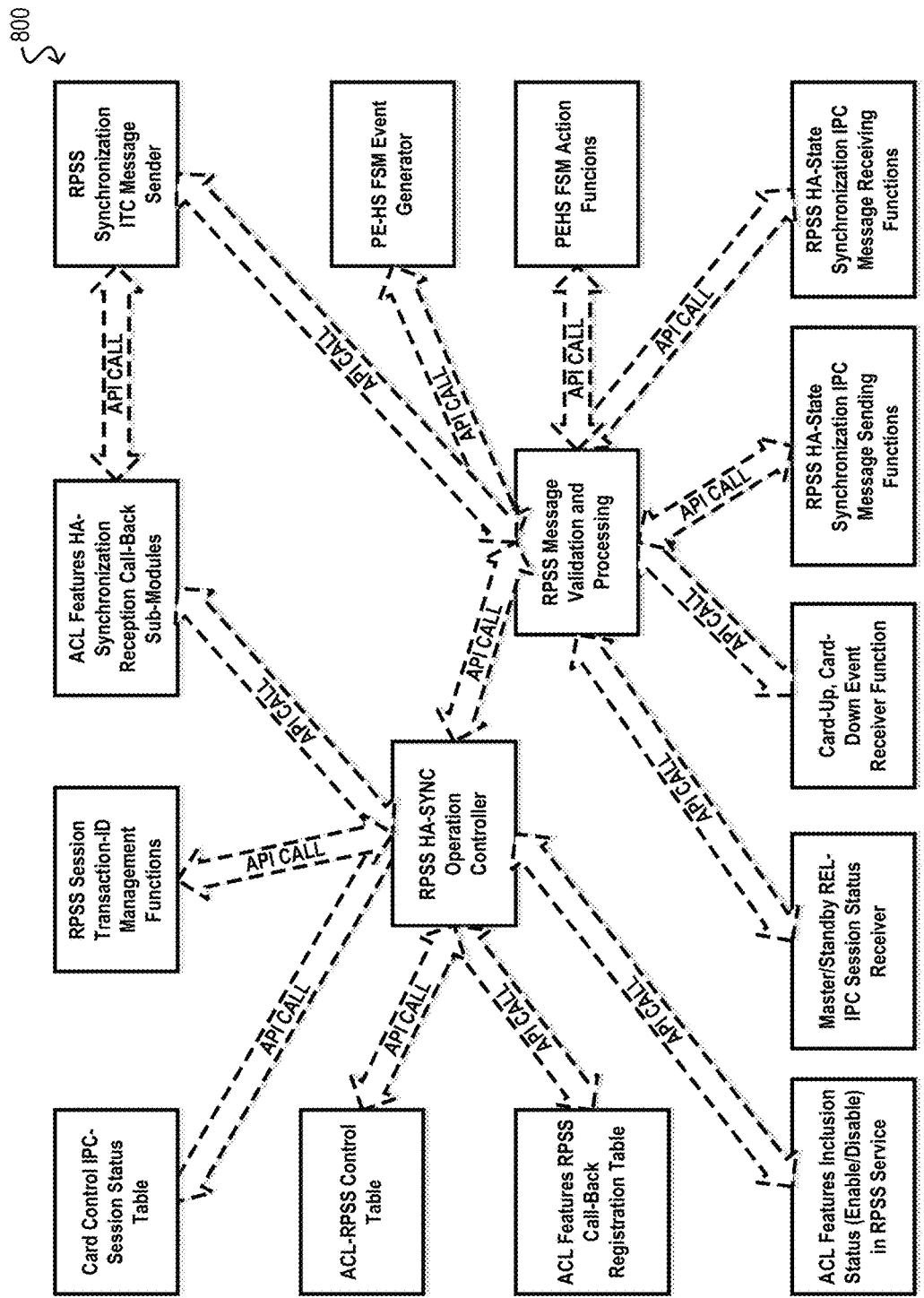
FIG. 8 depicts functional components of a redundancy pair state synchronization manager according to an embodiment.

FIG. 8 depicts a diagram 800 of the functional components of the ACL-RPSS-Manager according to an embodiment. The ACL-RPSS-Manager can provide the following features/services:

Master/Standby Discovery and Status Monitoring
Monitors card-up/card-down events for all stack member units in the ACL Task.

Master/Standby Reachability Monitoring
HA-SYNC REL-IPC sessions init/de-init, activate/deactivate notifications [after duplicate filtering] are relayed as REL-IPC status change ITC message to ACL-Task [From APPL Task].
RPSS-Manager at Master/Standby starts/stops processing HA-SYNC request/response messages based on HA-SYNC REL-IPC session up/down ITC event notifications.

RPSS Manager Service Registration
Facilitates HA-SYNC service for the ACL features via dynamic callback registration.
Manages/allocates unique Transaction-ID (32-Bit sequence number) on a per HA-SYNC channel basis, '<ACL-Feature-ID, Transaction-ID>'.
Allocates/deallocates memory for HA-SYNC transaction messages for ACL features.
Dynamic HA-SYNC messages are exchanged without requesting delivery confirmation.

3.2.2.3.1 ACL-RPSS-Manager Transport Layer Congestion Control

RPSS-Manager Receiver Side Flow Control—The RPSS-MGR on the receiver side will monitor the ITC queue depth of the ACL feature application. In the event that the ITC queue becomes full or reaches a pre-configured high watermark threshold, the RPSS-MGR will instruct the underlying REL-IPC Connection to suspend message delivery for the specified REL-IPC channel. When the ACL feature's ITC queue occupancy rate falls below the high watermark, the RPSS-MGR will re-enable message delivery by instructing REL-IPC connection to resume message delivery for the specified REL-IPC channel. This is so done to prevent any SYNC message loss due to the ITC queue being full, when the ACL feature applications are not able to process the received HA-SYNC messages fast enough.

RPSS-MGR Sender Side Admission Control—The RPSS-MGR at the sender side will also monitor the availability of free buffer space in the underlying REL-IPC channel. When the remaining buffer space available falls below a low watermark (i.e., minimum SYNC message MTU), the RPSS-MGR will stop accepting SYNC-Message send requests in order to avoid message transmission requests being dropped by the REL-IPC layer. This condition will be treated as a flow control (back-pressure) generation to the respective ACL features, which should in turn propagate flow control to their upstream partner components (i.e., CLI, SNMP, Open-Flow, Web-Management, NETCONF etc.). When the REL-IPC channel's buffer space availability returns to the low watermark (minimum MTU size), RPSS-MGR will restart accepting SYNC message delivery requests from the ACL features.

3.2.2.3.2 ACL-RPSS-Manager HA SYNC Traffic Load Balancing

Load Balancing—When this feature is enabled, the ACL-RPSS-Manager uses multiple REL-IPC connections (up to a configured max number) in order to distribute HA-SYNC messages of multiple ACL features across different REL-IPC transport connections. Note that in this case, the RPSS HA-SYNC messages may be delivered out-of-order. RPSS-Manager maintains a message reassembly context on a per ACL-feature-ID basis, in order to re-construct the original sequence of the HA-SYNC messages based on the transaction-ID of the messages. RPSS HA-SYNC channel for an ACL feature is uniquely identified by the tuple <Source-Unit-ID, ACL-Feature-ID, Transaction-ID>.

HA-SYNC Channel Prioritization—RPSS HA-SYNC channels <Source-Unit-ID, ACL-Feature-ID, Transaction-ID> can be prioritized based on priority requirements of ACL features. HA-SYNC messages of higher priority ACL features would be delivered before the lower priority features, so that those SYNC messages are not rejected/dropped during congestion [All REL-IPC messages are sent with IEEE 802.1P CoS marking].

3.2.2.4 Baseline State Synchronization to Standby CBs

The Baseline State Synchronization process is the HA check-pointing synchronization of dynamically learnt states of applications from the master CB node to the standby CB node, when the standby CB becomes operational for the first time.

A generic component termed as 'ACL Baseline State Synchronization Manager (ACL-BLSS-MGR)" has been designed to perform the baseline state synchronizations for various applications that may be running in the Master CB node of the Extended Virtual Bridging Network Topology. This generic component 'ACL-BLSS-MGR' essentially:

- Facilitates dynamic registration of ACL-BLSS Tuple Space walk callbacks.
- Monitors core stack [Master, Standby, Member] card up/down and REL-IPC Conn up/down indications To start/stop PE hot swap.
- Triggers tuple space walk callback(s) for registered ACL BLSS features in pre-defined sequence of tuple space graph walk.
- Remembers tuple space walk context returned from ACL BLSS feature's walk callback.
- Listens for BLSS transaction delivery response via RPSS HA-SYNC to trigger BLSS walk callback for the next saved tuple space context.
- Terminates ACL-BLSS tuple space Walk, when the last distributed tuple's response is received from the standby unit.
- Uses adaptive rate control for BLSS tuple space walk in the event of response timeout or REL-IPC send failure.
- Uses bulk transfer mechanism with NACK and ARQ support for missing/lost SYNC transactions.

4. Distributed Transaction Management

To support the high availability techniques described above, a mechanism is needed for reliably and efficiently communicating messages between the various nodes in an extended bridge. This ensures that rule programming messages and other messages (e.g., configuration data, event reports, system log reports, error reports, etc.) are delivered to their respective destinations, with as little latency as possible. The following sub-sections detail a distributed transaction manager (DTM) for achieving this functionality.

4.1 Distributed Transaction Service Model 4.1.1 Master Initiated Distributed Transaction Service The DTM can supported three types of master CB initiated transaction services. The first is a point-to-multipoint (P2MP) service that can perform, e.g., distribution to all PE destinations, distribution to all transit PE destinations, distribution to all edge PE destinations, or distribution to all core stack units (including standby CB(s)). The second is a point-to-point (P2P) service that can perform distribution to any single core stack unit or PE destination. The third is a broadcast service that can perform distribution to all core stack units and all PE destinations.

4.1.2 PE Initiated Distributed Transaction Service

The DTM can support three types of PE initiated transaction services. The first is a point-to-multipoint (P2MP) service that can perform distribution to a subset of CB destinations. The second is a point-to-point (P2P) service that can perform distribution to any single CB destination. The third is a broadcast service that can perform distribution to all CB destinations.

4.2 Transaction Distribution Mechanism 4.2.1 DTM Architecture

Figure 9:
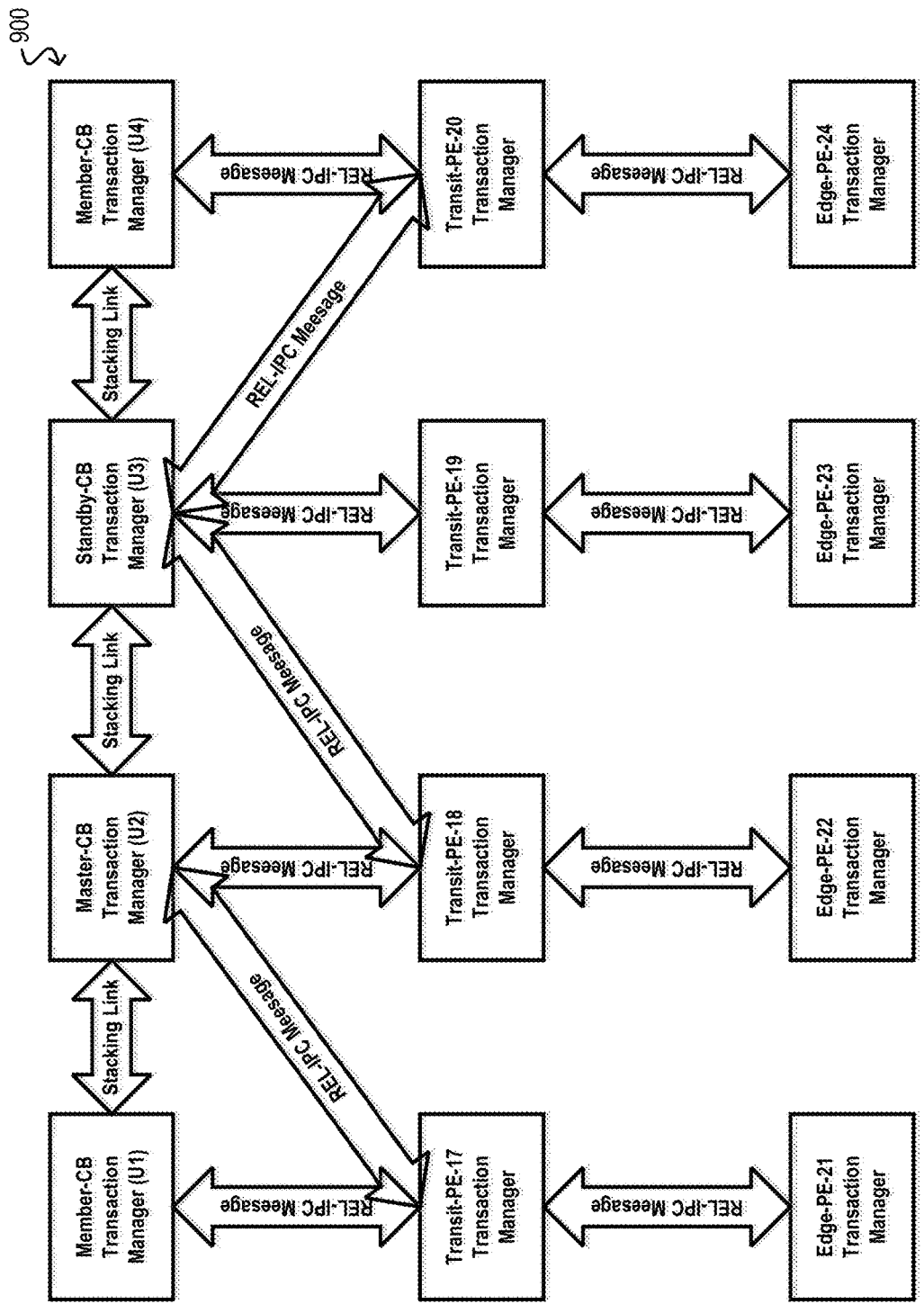
FIG. 9 depicts the architecture of a distributed transaction manager according to an embodiment.

FIG. 9 depicts a diagram 900 of the architecture of the DTM according to an embodiment. As shown, the architecture comprises a transaction manager component residing on each node of the extended bridge topology. These components can operate in a master or slave mode depending on the direction in which transactions are being distributed (detailed below).

4.2.2 DTM Layering Hierarchy

Figure 10:
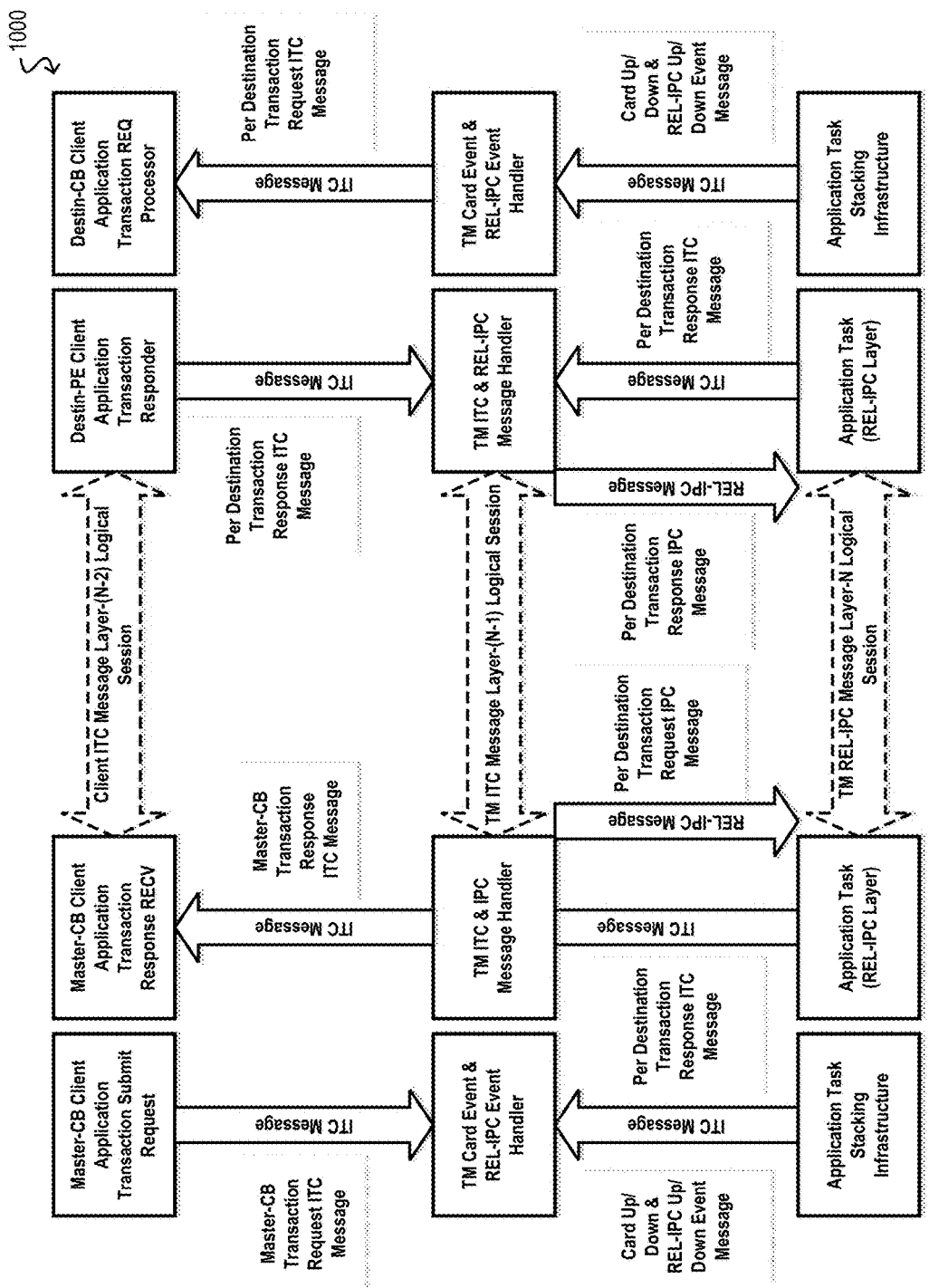
FIG. 10 depicts a message exchange layering hierarchy for the distributed transaction manager of FIG. 9 according to an embodiment.

FIG. 10 depicts a diagram 1000 illustrating a message exchange layering hierarchy for the DTM according to an embodiment. This diagram shows the protocol layering hierarchies, in transmit and receive paths of transaction distribution message exchanges between the master CB node and destination PE devices and/or member CB devices.

The client applications in the master CB node submit transaction requests via sending ITC message to the Transaction Manager task, which in turn relays the transaction request to its user specified list of destination devices by sending Reliable IPC (REL-IPC) messages.

At the destination the REL-IPC message containing the transaction request is first received by the "Application Task' which is the main controller task of routing/switching. The REL-IPC message containing the transaction request is then relayed to the Local Transaction Manager Task, as Inter-Task-Communication (ITC) message.

The Transaction-Manager task upon receiving the Transaction Request via incoming ITC message, in-turn forwards it to the destination device's Client Application Task, e.g. "Access Control List (ACL) Task' for performing the requested action carried by the Transaction.

When the Transaction's requested action is completed, by the Client Application, a success or failure response is returned back to the Transaction Manager at the Master CB Node.

In returning a Response for the Transaction, similar sequences of ITC and REL-IPC messages are transmitted from each of the Destination device that had received the Transaction request. The Transaction response is returned from the Destination devices by retracing the same path in the reverse direction that was followed by the Transaction request message forwarding towards the destinations from the Master CB node.

4.2.3 Transaction Distribution Via P2MP IPC Tunnel Path

When a new transit PE node joins the extended bridge under a CB node or a new CB node joins the bridge, alternate routes may be feasible to reach one or more destination edge PE nodes. Depending on the link capacities (bandwidth) and the hop counts, these alternate paths may be more optimal.

4.2.4 Transaction Distribution Via P2P IPC Tunnel Path

The P2P single destination addressed Transactions are distributed by the Transaction Manager from master CB node towards the destination devices, using the same method of REL-IPC message sending to the destinations and then waiting for Transaction delivery responses to arrive from the destinations.

However, P2P Transactions are distributed to a single destination only and hence response is expected from only one destination.

4.2.5 Leaf Initiated P2P Transaction Distribution

In this mode, a leaf node (i.e., an edge PE) originates a transaction service request which is distributed to a single destination CB device of the extended bridge.

Certain protocol applications running on the edge PE devices may accumulate dynamic status data or statistics that need to be sent to the master CB or other member CBs, where such data may be used for further processing by network management applications (e.g., SNMP agent or CLI).

Such dynamic data can be reliably sent from the edge PEs to the master CB via transaction services. In this mode of leaf initiated transaction services, the edge PEs utilize the master mode of transaction services and the destination CB devices utilize the slave mode of transaction services.

4.2.6 Leaf Initiated P2MP Transaction Distribution

In this mode, a leaf node (i.e., an edge PE) originates a transaction service request which is distributed to multiple CBs.

When an edge PE's protocol application needs to send transaction data to multiple destination CBs (not just the master CB), the transaction manager on the edge PE plays the role of a master instance and delivers the transaction to the corresponding protocol applications via a slave instance of the transaction-Manager running on each of the destination CBs.

Thus the distributed transaction management service is symmetric, i.e. both the CB and PE devices can simultaneously run master and slave instances of the transaction manager.

4.2.7 Master CB Initiated Transaction Distribution to PE

Figure 11:
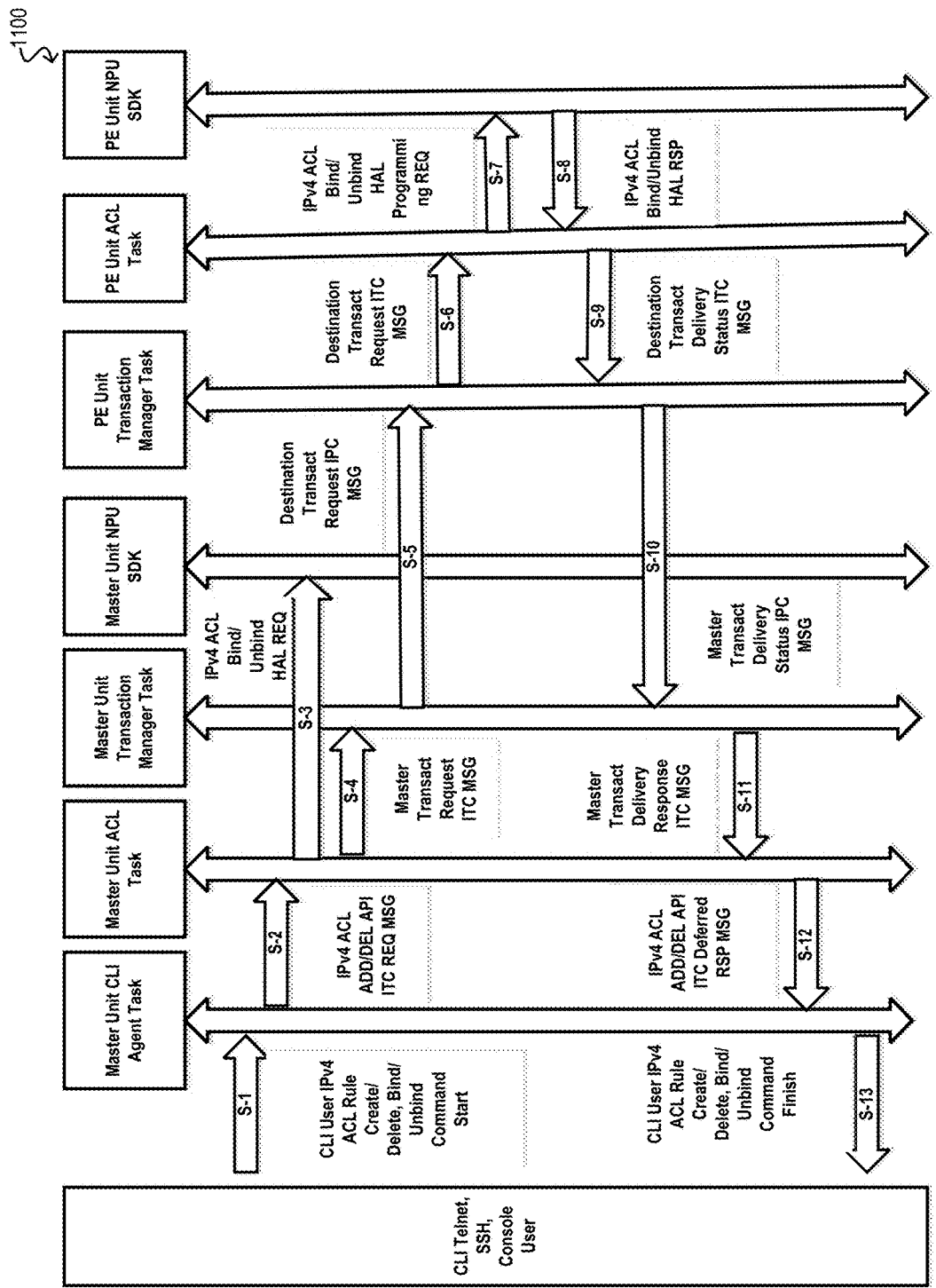
FIG. 11 depicts a rule distribution workflow from a master CB to a PE using the distributed transaction manager of FIG. 9 according to an embodiment.

FIG. 11 depicts a workflow 1100 illustrating how a packet classification rule add or delete command may be distributed from the master CB to a destination PE via the transaction manager according to an embodiment.

4.2.8 PE Initiated Transaction Distribution to Master CB

Figure 12:
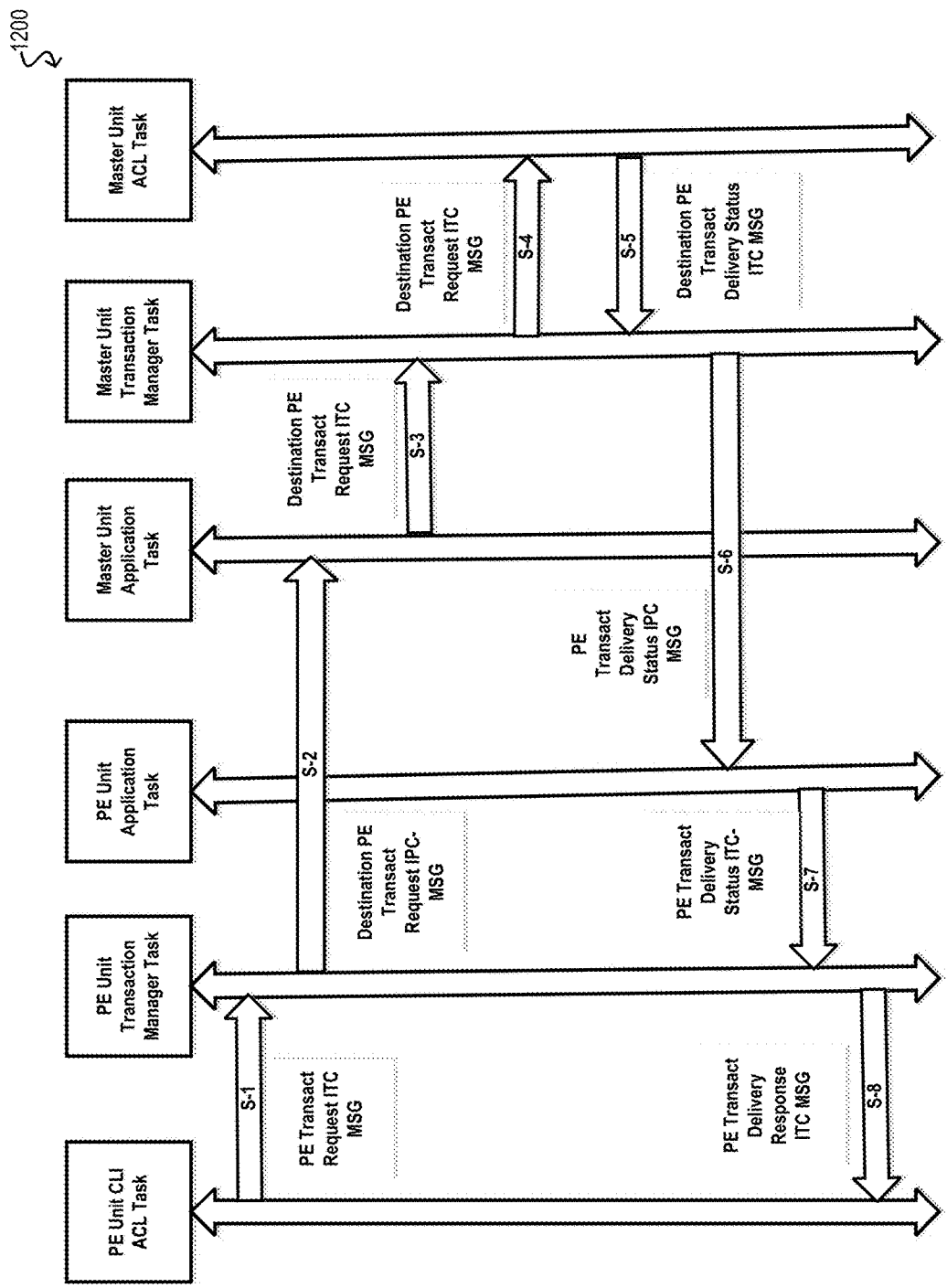
FIG. 12 depicts a transaction request workflow from a PE to a master CB using the distributed transaction manager of FIG. 9 according to an embodiment.

FIG. 12 depicts a workflow 1200 illustrating how a transaction request may be distributed from a PE to the master CB via the transaction manager according to an embodiment.

4.3 Transaction Distribution Topology Management

4.3.1 Path Computation for P2MP and P2P IPC Tunnels

In an IEEE 802.1BR domain, the CB devices are responsible for discovering the PE devices that are present in a tree topology, with CB device itself being the root of the tree. The CB and PE devices discover each other by running IEEE 802.1AB based LLDP protocol with IEEE 802.1BR extensions.

Each CB device, which is a root node of a CB-PE forest, discovers the PE tree topology rooted at itself and forwards such topology information to the master CB, where it gets consolidated with similar tree topologies learned via other CB devices. Thus the master CB has complete view of the CB-PE forest topology.

A path computation manager that resides on the master CB can compute constrained path from a graph (forest) representation of the IEEE 802.1BR domain using standard Shortest-Path-First algorithm, e.g., Dijkstra SPF algorithm.

Alternatively Johnson's All-Pairs Shortest-Path-First algorithm can be used to calculate paths to reach any node from the master CB.

When a new transit PE joins the PE tree under a CB node or a new CB node joins the PE forest topology, alternate routes may be feasible to reach one or more destination edge PEs. Depending on the link capacities (bandwidth) and the hop counts, these alternate paths may be more optimal.

4.3.2 Explicit Routing of P2MP and P2P IPC Tunnel Paths

By default the Reliable IPC path from Master CB node to any other Member-CB or PE node is selected as sequence of hops based on default cost metric of the hops. The cost metric of a hop is inversely proportional to the Link speed or Link bandwidth.

Thus a high speed link would be treated as a lower cost hop than a hop traversing a lower speed link. But when Transaction Manager intends to select a Path that is optimized for more than one metric or different metric than the cost metric, for Traffic Engineering purposes, then the multiple QoS parameters constrained optimal path can be computed using standard path computation algorithms found in research literature, such as A-Star Pruning, K-Shortest Path computation etc When such multi-constrained optimal path(s) are computed, the Transaction REL-IPC messages would be sent over those path(s) as explicitly routed path(s).

In explicit routing mechanism, the sequence of Hops are encoded as Hop Vector in the REL-IPC message header. An explicit Hop is represented by a Tuple <Source-Node-ID, Destination-Node-ID>.

Starting with the Master CB node, every hope forwards the transaction REL-IPC message to the next-hop that is present in the Hop Vector of the message header.

4.3.3 Explicit Recording of P2MP and P2P IPC Tunnel Paths

The Transaction Manager can request for Actual Hops to be recorded both in the forward direction and also in the reverse direction, when there are multiple parallel links along a Hop for redundancy or as alternate for IPC traffic load balancing purposes. The recorded actual hops traversed would be useful in performance calculation of Path(s) e.g. Path Latency, Jitter etc. calculations.

4.3.4 Re-Optimization of P2MP and P2P IPC Tunnel Paths

When Tunnel Manager has been configured to use Traffic Engineered Paths through the Network Topology of extended virtual bridging, its responsibility of the Path Manager, i.e. Path Computation Engine, to continuously monitor the Network for availability of better path(s) that would satisfy higher optimized QoS parameters as Traffic Engineering objectives.

When the extended virtual bridging network topology changes due to joining of new Member-CB or PE devices or detachment of existing Member-CB or PE devices in the network topology of extended virtual bridging, a set of new paths with more optimal traffic engineering objectives might be available or some existing optimal paths may become unreachable.

Thus the Path Manager (Path Computation Engine) would schedule re-computations of a set of Paths needed for the connection oriented reliable IPC (REL-IPC) service from the Master CB node to any other Member-CB or PE node(s). The newly computed paths would be used for establishments of new REL-IPC connections or re-routing the existing REL-IPC connections.

If a re-routing is required due to availability of more optimal path than the currently used less optimal path, then re-routing is handled in a Make-Before-Break manner.

In other words, a New REL-IPC connection is established over the newly computed more optimal End-To-End Path first and Transaction-Manager is notified by the REL-IPC Connection Management Layer, to use the new Path. When Transaction Manager has started Using the new Path and also stopped using the Old Path, the Old less optimal Path is released by the Path-Manager.

4.3.5 Call Admission Control (CAC) of P2MP and P2P IPC Tunnel Paths

For the P2MP and P2P Tunnel Paths, the REL-IPC Connection establishment process would involve required bandwidth provisioning against the underlying Layer-2 logical and/or physical interfaces hop-by-hop along the tunnel path. The Transaction Manager would request a REL-IPC connection establishment with the lower layer VLAN interfaces infrastructure, to provision Ethernet dual rate shaper configuration parameters, which are typically the 4-Tuple <CIR, CBS, EIR, EBS>. Here CIR means 'Committed Information Rate', CBS means 'Committed Information Burst', EIR means 'Excess Information Rate', and EBS means 'Excess Burst Size'. There may be multiple REL-IPC connections carried over reserved VLAN(s) that are dual rate shaped by the data-plane H/W forwarding engine of the routing/switching devices in the extended virtual bridging topology.

Thus in order to admit a new REL-IPC connection, through an Ethernet port, sufficient remaining bandwidth should be available, so that bandwidth guarantees of the existing already admitted connections are not violated.

4.3.6 P2MP and P2P IPC Tunnel Path Failure and Pruning

When a Link goes down or a PE or Member-CB device goes down, one or more P2MP and/or P2P Tunnel Path may become broken and the destinations may become unreachable from the Master CB node.

The Path Computation Engine would then re-schedule computation of alternate paths to re-route around the failures, if any such alternate paths are available in the extended virtual bridging network topology.

When alternate Paths are available, the REL-IPC Tunnels would be re-routed over the new Paths. The older broken Paths could then be pruned and released.

4.4 Distributed Transaction Delivery Model

A transaction can be distributed with delivery confirmation, without delivery confirmation, or only to reachable destinations.

In the case of a failure during transaction distribution, rollback-based recovery (via un-commit) can be performed at delivery completed destinations. Alternative, the failure can be ignored and the TM can continue delivering the transaction with remaining destinations. Alternatively, the TM can stop at the first failure and conclude delivery.

In the case of a timeout during transaction distribution, the TM can either: (1) immediately stop delivery, (2) repeat distributions to non-responding destinations based on a retry timeout interval, or (3) exponentially back-off retry timeout interval.

4.4.1 Transaction Delivery Confirmation

The Client Applications can submit Transaction distribution requests with or without requiring a Delivery Confirmation from the Transaction Manager. When No delivery confirmation is needed, the remote destinations will process the received Transaction, but will not send any delivery confirmation via Transaction response.

4.4.2 P2MP Transaction Delivery Response

In the case of a P2MP Transaction, since the Transaction message is distributed to multiple destinations, the Transaction Manager at the Master CB would also receive responses from multiple destinations.

The Transaction Manager would consolidate all the received responses by merging the Delivery Status received from all the destinations, and a single final response is returned to the Client Application that had originally requested the Transaction.

4.4.3 P2P Transaction Delivery Response

In the case of a P2P Transaction, the Transaction message is distributed to a single destination. The Transaction Manager would receive a single response, which would be returned to the Client Application that had originally requested the Transaction.

When the P2P Transactions are distributed in the Burst mode, the Transaction Manager would receive response only for the last Transaction in the Burst, i.e. for the Transaction which has the highest sequence number in the Burst. Thus Transaction Manager would send a Delivery Response only for the highest sequence numbered Transaction of every Burst, to the Client Application. The Client Application would then free the held resources of Transaction Objects for all Transactions up-to and including the Highest Sequence number at that time.

4.4.4 Distributed Transaction Rollback Recovery Mechanism

The Transaction Manager [TM] facilitates a Policy based sequenced guaranteed delivery of Transaction requests to the user requested destinations. When the Rollback Recovery Policy is selected, the TM guarantees that either the requested Transaction is delivered to all the requested, but reachable destination devices successfully or not delivered to any of the reachable destinations at all.

When the 'Rollback Recovery' policy is selected, there is no partial delivery to only a subset of destinations that are reachable from the Master CB.

In other words, if the Transaction delivery attempt to one or more of the reachable destinations had failed or the Transaction request was rejected at one or more destinations, then the TM at Master CB would send the Transaction Rollback request to all the destinations where the Transaction was successfully delivered.

When a Transaction Rollback request is received by the TM at a destination device, i.e. either Member-CB or PE device, a reverse action is executed to undo any configuration modifications or to undo any Hardware forwarding engine provisioning that was successfully completed earlier as a forward action.

4.4.5 Distributed Transaction Failure Recovery Mechanism

Alternatively, the TM can stop at the first failure and conclude delivery.

4.5 Transaction Message Processing Architecture

4.5.1 Reliable Delivery

For reliable delivery, transactions can be distributed in a multicast overlay topology, independent of the underlying network topology and PSN tunneling mechanism. A P2MP multicast tunnel in the overlay network can map to a group of P2P unicast REL-IPC tunnels of the underlay network.

In these embodiments, P2MP transaction distribution is achieved using ingress replication over the P2P REL-IPC Tunnels. Further, message level reliability is achieved via REL-IPC's ingress retransmit mechanism and transaction level reliability is via explicit delivery confirmation from the destination PE devices.

4.5.3 Transaction Message Transmission

A Transaction message can have two types of destinations, viz. remote destination device, which is a Member-CB or a PE device or a local destination, which is the Master CB node itself.

Thus for remote destinations the transaction messages are sent over REL-IPC Connections and for Local destination, the transaction messages are sent to Local Node's Client Applications via Inter-Task-Communication (ITC) messaging.

The REL-IPC which is 'Reliable Inter-Processor Communication (REL-IPC)' facilitates a sequenced guaranteed delivery of messages across the nodes.

4.5.4 Transaction Message Reception

When the Transaction messages are received by the Transaction Manager, the message parameters are parsed and validated. From the received message a literal event is generated which is then run through the Transaction Finite State Machine for complete processing of the message.

4.5.5 Transaction Message Error Handling

A received transaction request may fail at a remote destination device for various reasons, including but not limited to, unknown configuration parameter provisioning action, attempt to provision a non-existent configuration object on the H/W forwarding engine etc. Such failures are reported back via the Transaction Delivery Response messages from Destination devices to the Transaction Manager at the Master CB node.

The Transaction Manager at the Master CB node upon receiving Transaction failure response, conveys the failure status back to the Client Applications e.g. ACL Task for further error diagnostics and reporting the error at the CLI console or SYSLOG or other NMS management stations.

4.6 Transaction Message Queuing Scheduling

The transaction manager is designed to provide transaction services to multiple client applications simultaneously via multiple parallel application layer channels. The application layer channels (ACH) are identified by unique 32-bit Channel ID numbers.

The transaction requests received over different ACH are handled by the transaction manager as separate transaction object flows end-to-end. In other words, the transaction manager guarantees an in-order delivery of all transaction requests received over a particular ACH, and transactions across different ACH(s) are not mixed up.

4.6.1 Transaction Message Queue Mapping

In order to facilitate transaction distributions to multiple P2MP multicast destination groups and P2P unicast destinations, the transaction manager maintains a separate transaction queue set for each such destination-group or individual destination.

Within each queue set, there are multiple queues one for each Application Layer Channel (ACH). Thus if the transaction manager is required to provide transaction services over each of the 'H' number of ACH(s) to 'M' number P2MP Multicast destination groups and 'U' number of P2P Unicast destinations, then total number of transaction queues that need to be maintained by the master instance of the transaction manager is Q=(M+U)*H.

In certain embodiments:
P2MP transactions are en-queued to a TM P2MP ingress queue selected by Channel-ID <S,G=TM-Instance-ID>
P2P transactions are en-queued to TM P2P ingress queue selected by Channel-ID <S,PE-Unit-ID=TM-Instance-ID>
ITC transaction request messages from end users (e.g., client applications) are en-queued to TM-Task medium priority queue.
ITC transaction response messages from destination PE devices (via APPL-Task) are en-queued to TM-Task medium priority queue.
All control ITC messages (REL-IPC Session Up/Down, Transaction HA-SYNC etc.) are en-queued to TM-Task high priority queue.

Figure 13:
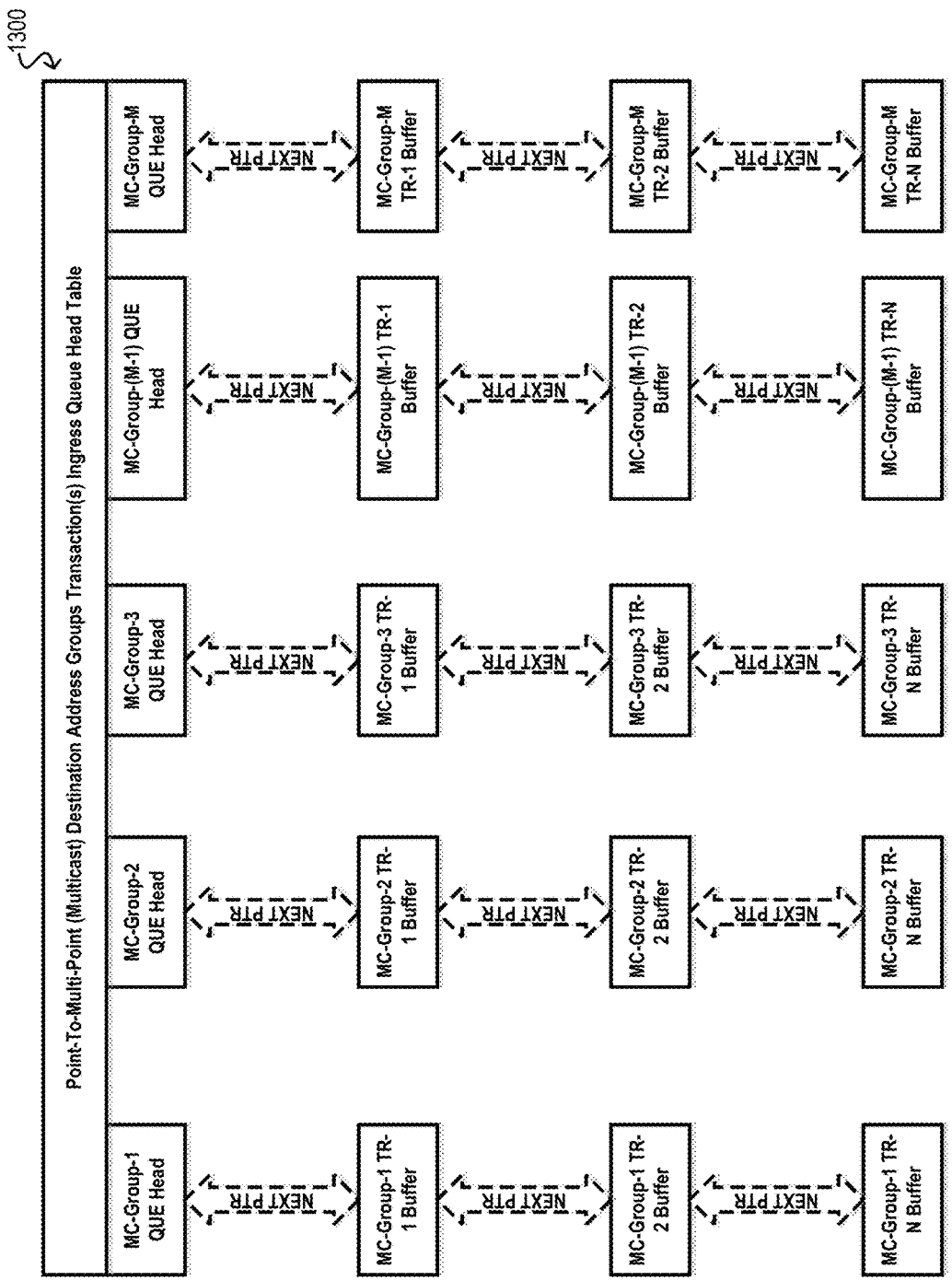
FIG. 13 depicts P2MP ingress queuing that may be performed by a transaction manager component at the master CB according to an embodiment.
Figure 14:
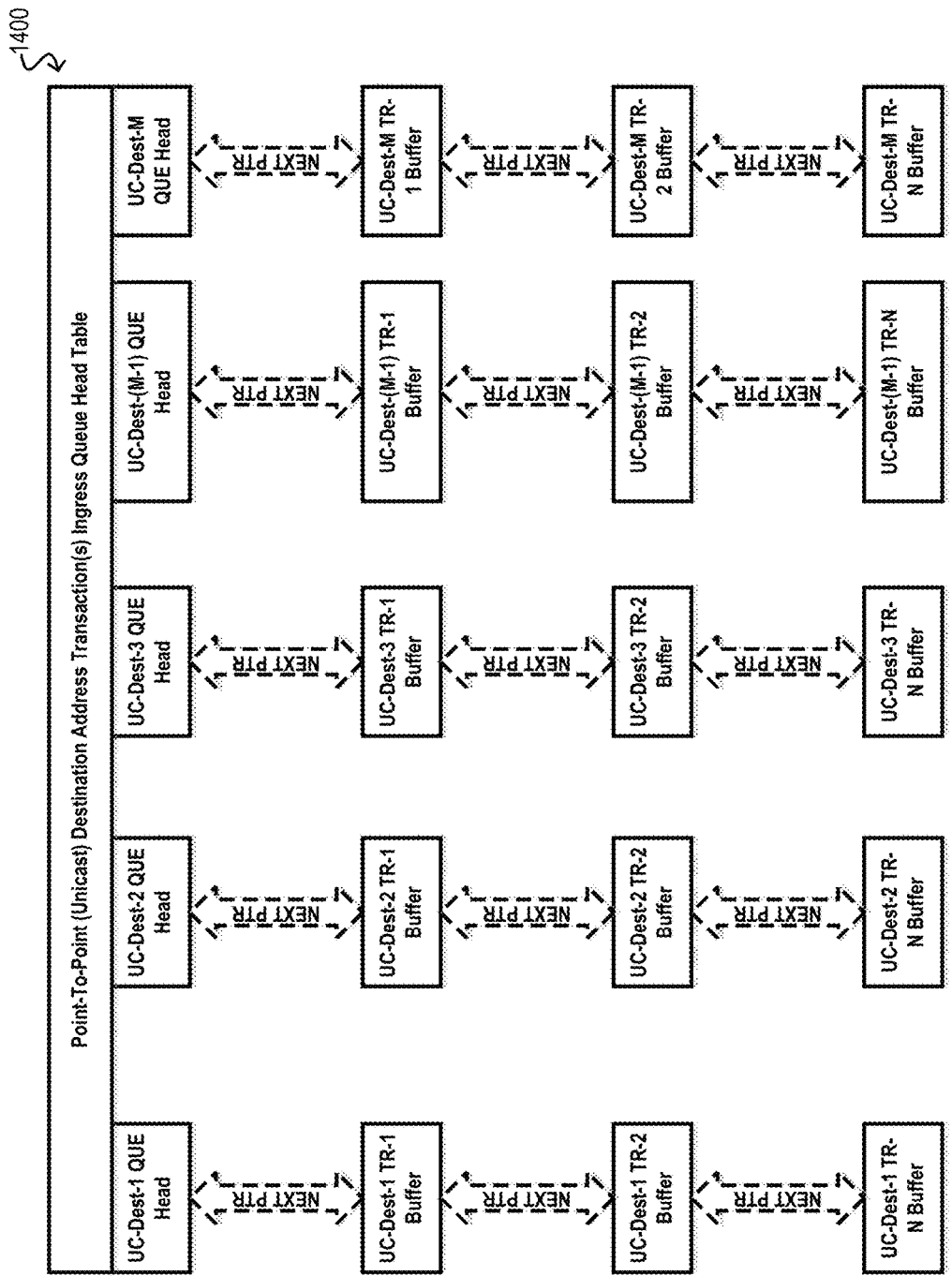
FIG. 14 depicts P2P ingress/egress queuing that may be performed by a transaction manager component at the master CB according to an embodiment.

FIG. 13 depicts a diagram 1300 illustrating P2MP ingress queuing that may be performed by the TM at the master CB according to an embodiment, and FIG. 14 depicts a diagram 1400 illustrating P2P ingress/egress queuing that may be performed by the TM at the master CB according to an embodiment.

4.6.3 Queued Transaction Processing

All received transaction requests are en-queued in the ingress transaction queues (ITQ) at the Master CB node. The P2MP and P2P transactions are held separate ITQ(s). The received transactions from each ITQ are processed in FIFO order. When a transaction from the head of an ITQ is distributed towards its P2MP or P2P destination(s), the remaining transactions if any in that queue would stay as pending transactions. When the transaction at the head of an ITQ has finished its delivery, it is deleted from the queue and its resources are freed. The next transaction which is now at the head of an ITQ is now selected for processing and distribution towards its user requested destinations. This process continues as long as an ITQ is non-empty.

4.6.4 Transaction Manager Hierarchical Scheduling

The Transaction Manager supports two level hierarchical scheduling of the transactions received at the Master CB node. The priority of a transaction request is determined based on its Application Layer Channel ID. Up to 8 levels of priorities, with 8 being the highest are supported.

The transaction scheduler services pending transactions from ITQ(s), strictly in descending order of priorities. In other words the Transaction Scheduler would service all pending transactions from the highest priority (8) ITQ first.

When there are no more pending transactions in ITQ, at priority level '8', the pending transactions from ITQ at priority level '7' would be serviced. Similarly when there are no more pending transactions at priority level '8' and '7', the transactions from priority level '6' would be serviced.

This in general when there are no more pending transactions at priority levels J+1, J+2, . . . 8, then the transactions at priority level T ($1<=J<=8$) would be serviced.

When there are multiple Application Layer Channels with the same priority the corresponding ITQ(s) would has same priority, but each such queue would be assigned a separate weight for scheduling purposes.

Thus the pending transactions from all ITQ(s) of the same priority level would be serviced in a weighted round robin manner (WRR) proportional to their weights. The WRR mechanism allows a fair Service multiplexing of Transactions originated from different client applications that need servicing at same priority level.

4.6.5 P2MP Transaction Scheduling

The P2MP Transactions are addressed to destination groups, i.e. multiple destinations in the extended virtual bridging network topology. These transactions when received at the Master CB node, are kept in separate ITQ on per P2MP Destination Group and per Application Layer Channel (ALC) basis.

The P2MP transactions are hierarchically scheduled for servicing for each P2MP destination groups independently. For each P2MP destination group, the ALC based ITQ(s) are scheduled in strict priority order. When there are multiple ALC(s) at the same priority level within a P2MP destination group, the ITQ(s) of those ALC(s) are further scheduled in a WRR manner based on the assigned weights on those ITQ(s).

4.6.6 P2P Transaction Scheduling

The P2P Transactions are essentially addressed to single destination in the extended virtual bridging network topology. These transactions when received at the Master CB node, are kept in separate ITQ on per Destination and per Application Layer Channel (ALC) basis.

Thus the P2P transactions are hierarchically scheduled for servicing for each destination independently. For each destination the ALC based ITQ(s) are scheduled in strict priority order. When there are multiple ALC(s) at the same priority level, the ITQ(s) corresponding to those ALC(s) are further scheduled in a WRR manner based on the assigned weights on those ITQ(s).

4.7 Bulk Mode P2P Transaction Distribution Service

Bulk mode P2P involves using unicast transaction distribution using a per-channel transmit window.

The TM transmits a partial burst of 'N' transactions, when Channel Ingress Queue Length (N)<TX-Window Size (W) [Default=32].

The TM transmits a Full Burst of 'W' transactions, when Channel Ingress Queue Length 'N'>=TX-Window Size (W).

All transactions are transmitted with 'Delivery-Confirm-ACK Not Required' option set, except the burst-end transaction.

The TM starts a 'Burst End Marker' timer [O(100 Ms)] to determine burst end transaction arrival, when Channel Ingress Queue Length (N)<TX-Window Size (W). If the 'Burst End Marker' timer expires, an explicit ACK request is sent containing the sequence number of the last sent transaction as the 'Burst End Marker'.

Pending transactions in the transmit window are freed, when either Burst-End Transaction Delivery Confirmation or an explicit ACK is received. Pending transactions from the channel ingress queue are serviced again as the next burst. All parameters for the bulk-mode transaction distribution are configurable via DM commands.

4.7.1 Bulk Distribution Transaction ID/Sequence Numbers

The bulk mode Transaction distribution service is supported only for Unicast, i.e. P2P transactions. The Transaction ID(s) which are 32 bit positive integers are allocated independently for P2MP and P2P Transactions.

For P2MP Transactions, the Transaction-ID value is allocated on per P2MP Group Address and per Application Layer Channel (ALC) basis.

For the P2P Bulk mode Transaction distribution, the Transaction-ID value is allocated on per-destination and per Application Layer Channel (ALC) basis.

Thus independent allocation of Transaction-ID(s) on a per ALC basis, for P2MP and P2P destined transactions, allows in-order, sequenced delivery of simultaneous Transaction requests originated from multiple different Client Applications, without impacting inter-applications functional ordering dependencies and without causing any additional latencies among the Client applications.

4.7.2 Bulk Distribution Selective Acknowledgement

The P2P Bulk mode transaction distribution, a sequence of 'N' number of Transactions (termed as Bursts) are distributed to the destination at stretch, without requesting for delivery Acknowledgement for each individual transactions. The delivery confirmation/acknowledgement is requested only for the highest sequence numbered 'N' transaction in a Burst.

Thus when a delivery confirmation is received for a P2P Transaction of Sequence Number 'N' the, Transaction Manager at the Master CB node would consider that all Transactions up-to sequence number 'N' from that particular Destination and ALC combination has been successfully delivered. This mechanism allows reduction in Acknowledge message processing overhead on the Host Processor of the Master CB node and also reduction in the bandwidth consumed over the internal Links of the extended virtual bridging topology.

4.7.3 Bulk Distribution Selective NACK

The Bulk distribution model eliminates the need for individual P2P Transactions, within a burst (i.e. sequence of transactions) that are successfully delivered at the destination. However P2P transactions which might be missing or lost in the transit, would cause a gap in the sequence at the destination receivers. Thus the missing Transactions need to be re-transmitted from the Source, i.e. Transaction Manager at the Master CB node, so that the destination receivers are able to reassemble the complete Burst of Transactions after receiving the transactions within the sequence gap.

To allow such sequence gap recovery, the destination receivers would send a NACK message listing down the missing sequence numbers to the Master CB. The NACK message would simply contain a Bit Vector with start sequence number and the last sequence number of the Bit Vector and each bit corresponding to the missing Sequence number would be set to '1'. The Transaction Manager at the Master CB upon receiving a NACK request would re-transmit the P2P Transactions whose Sequence Numbers are found set to '1' in the message.

4.7.4 Burst Limit Control Timer

When multiple PE or Member-CB devices rebooted at the same time, the PE-Hot-Swap process triggered tuple configurations downloading would generate a large volume of P2P transactions depending on the scale limit of various protocol features.

Since these P2P transactions need to be distributed towards the newly rebooted remote devices, the Transaction Manager [TM], would be required to form a Burst from the incoming P2P transactions as quickly as possible without waiting for a long time.

The Burst Length parameter is configurable by Network Administrator, however if the number of P2P Transaction requests received for a particular remote destination are less than the configured burst length value, then TM would start a Burst End Marker detector timer as a small duration timer, usually for a few 100 milliseconds.

If more P2P Transactions are received during the Burst End Marker Timer, and the complete Burst Length number of P2P Transaction requests are present then the Burst is considered full and the Transaction Manager proceeds with distributing the complete Burst.

However if the Timer expires and the Burst is Not Full yet, then whatever number of P2P transactions have been received and placed in the Queue for the P2P destination, would be considered as Forced Completed Burst.

The Transaction Manager however would always set the Acknowledgement wanted Flag in the header block of the Last received P2P Transaction of the current Burst. This would allow the destination receiver to send Acknowledgement only for the Last, i.e. highest sequence numbered P2P Transaction for that Destination's P2P Session, back to the Transaction Manager at the Master CB.

4.7.5 Burst Length Control

The Burst Length is the number of P2P Transactions that are distributed within a single burst to a destination. Transaction Manager supports a configurable Burst Length value, and network administrators can configure the Burst Length to a value such that the Burst mode P2P distribution does not cause congestion in the internal network of the extended virtual bridging topology.

The Burst Length should be chosen such that a fast distribution performance is achieved for the P2P Transactions, and at the same time, the host processors of the CB and PE nodes are not overloaded with transaction related IPC message processing overhead.

The Burst mode P2P Transaction distributions is important, since during a complete virtual bridging chassis rebooting, several protocol applications would need to distribute their protocol or network interfaces related configuration parameters to their counterparts in the destination PE devices and/or Member-CB devices as quickly as possible.

Typical values for Burst Length are 16, 32 or 64 depending the

4.7.6 Bulk Mode Queued Transaction Processing

When Transaction Manager is servicing the P2P Transactions in Burst distribution mode, the entire Burst of Transactions are treated as a single Logical Aggregate Transaction. Thus when the entire Burst of Transactions in a current Burst is delivery completed, the entire Burst of Transaction Objects would be removed from the Ingress Transaction Queue for that P2P Session and the Transaction object resources would be freed.

While a Burst of Transactions is being processed and awaiting delivery response at the Master CB node, several additional P2P Transactions for the same P2P Sessions might be received and en-queued as pending Transactions.

When the delivery of current Burst becomes complete, the next set of P2P Transactions waiting in the Queue if any would be grouped to form the Next Burs. The TM will continue with processing of the Next Burst of P2P Transactions in a similar manner. This process continues in a repetitive manner infinitely.

4.8 Transaction Persistence and High Availability

The transaction delivery services provided by the Transaction Manager, need to be highly robust and resilient in order to guarantee that various Protocol application's configurations are consistently and reliably distributed across the CB and PE nodes of an extended virtual bridging network topology.

4.8.1 Transaction Checkpointing on Standby CB

When the TM provides transaction distributions to various destination CB and/or PE devices, in the virtual bridging network topology, a set of dynamic states of the delivery response pending Transactions are accrued inside the TM at the Master CB node.

Such transitory dynamic states of the pending transactions are important until final delivery is complete. Hence those dynamic states need to be preserved via replication to an alternate standby Node.

In the event of a Master CB failure due to software or hardware faults, the alternate Standby CB would be able to take the role of a new Master CB and would continue servicing all the Response Pending Transactions and also any new Transactions from various applications that may arise after the failover.

The dynamic transitory states of pending transactions are check-pointed for High Availability purposes to the Standby CB. The Transaction check-pointing consists of replicating the original Transaction request object, followed by replication of incremental status updates due to reception of delivery responses from remote destinations.

The replicated copies of the Transaction and its status changes are sent via REL-IPC messaging scheme from the Master CB to the Standby CB. The Standby CB upon reception of the check-pointing messages simply re-construct the dynamic states of the pending Transaction, but does not Service it until a Failover has happened.

4.8.2 Prioritized HA SYNC Check-pointing Message Delivery Service

The REL-IPC transport message delivery services can be prioritized by assigning IEEE 802.1P CoS on the channel. The TM can create up to 8 REL-IPC channels one for each priority level, between Master and Standby.

The HA SYNC messages of TM will be delivered to standby CB, over the priority REL-IPC channel(s), so that SYNC messages are not rejected/dropped during congestion.

4.8.3 Dynamic State Reconstructions from Received HA SYNC Messages

Since both the original Transaction object and also the dynamic incremental updates of the status of all the pending Transactions sent from the Master CB to the Standby CB via check-pointing, i.e. as HA Synchronization Check-pointing messages, the Transaction Manager at the Standby CB would simply populate the pending Transaction Queue and the per-Transaction status object.

4.8.4 Transaction Manager Seamless Stack Switchover/Failover at PEs

The TM can establish REL-IPC Connections from PEs to both master CB and standby CB (i.e., dual homing). At the PEs, the REL-IPC connection pair is treated as a REL-IPC Tunnel Redundancy Group "RI-TRG." RI-TRG is up as long as at least one member in the tunnel redundancy group is up. Master CB switchover/failover at the stacking layer is seamless at dual-homed PE devices

4.8.5 Transaction Auditing for Post-Switchover Recovery

When the Standby CB assumes the role of a new Master CB, after the old Master CB goes down, the previously check-pointed pending Transaction's dynamic states may not be accurate, since one or more of the pending Transaction's delivery Response was not received by the old Master CB since it went down.

Thus the Transaction Manager at the new Master CB have to run an Auditing job of Pending Transaction statuses available at the destination Member-CB(s) and PE devices, against what is available in the local newly assumed Master CB node. The Transaction Manager at the new Master CB would send HA-Audit Query request messages to all the Member-CB devices and to all the PE devices known in the extended virtual bridging network topology. The remote Member-CB and PE devices upon receiving the HA-Audit Query request would respond with the last received request Transaction-ID and Last response sent Transaction-ID for each Application Layer Channel (ALC) back to the Transaction-Master of the new Master CB.

The Transaction Manager at the new Master CB upon receiving the HA-Audit Responses from all the Member-CB(s) and PE devices, would build an Audit Information Matrix (AIM), where each row is indexed by the Pending Transaction-ID and each Column is indexed by the Destination-ID from where Audit Response was received from.

The Matrix element for a specific Row and Column would indicate a 2-Tuple of <Last Request Received Transaction-ID, Last Response Sent Transaction-ID>. The Transaction Manager would then AIM Matrix entries with the Pending Transactions from its Local Transaction Queues to see which are in the Delivery Complete state.

The Transactions those are in Delivery complete state as indicated by the AIM Matrix entries, would then be treated as Final Delivery Response received transactions and the Responses would then be forwarded to the Client Applications.

The Pending Transactions which are not found in the AIM Matrix, would be considered as did not reach the destinations during Master CB failover, and hence those Transactions would be re-distributed afresh towards its user requested destinations. Such Transactions would be subsequently serviced in a normal manner.

4.8.6 Resuming Transaction Distribution Post-Switchover

Once the AIM Matrix based HA Auditing is complete, all the Pre-Failover pending Transactions are taken care of for the Service continuation or re-servicing until delivery is completed, from the new Master CB node.

Only after the AIM Matrix is built by fetching HA Audit query responses from all the Member-CB and PE nodes of the extended virtual bridging network topology, new Transaction distribution requests received if any from the Client Applications would be serviced by the Transaction Manager at the new Master CB node.

4.8.7 Transaction Manager Graceful Shutdown Procedure

Graceful shutdown often procedure is often used by network administrators for maintenance and servicing of hardware or software components of routing/switching nodes in the extended virtual bridging topology, or re-configuration of the virtual bridging network topology for addition or deletion or replacement of routing/switching nodes.

Thus when Network Administrator initiates a Graceful shutdown request for the entire virtual chassis from CLI or SNMP based NMS stations, there might be one or more Transactions still in the Queues of Transaction Manager at the Master CB node.

Thus Transaction Manager would make sure that the already admitted Transactions or partially serviced Transactions are first completed in a normal manner.

While the existing Pending transactions are still being serviced, the Transaction Manager at the Master CB node will not accept any new Transaction distribution request from any Client Applications, once the Graceful shutdown request has been received.

When the servicing of all the pending transactions have completed and deliver responses have been received from the destinations, and there are no more Pending Transactions in the Transaction Queues, the Transaction Manager would respond with Graceful-Shutdown Completion status to the Graceful shutdown coordinator at the NMS agents, i.e. CLI or SNMP or NETCONF Agent.

4.9 Scalability of DTM

Figure 15:
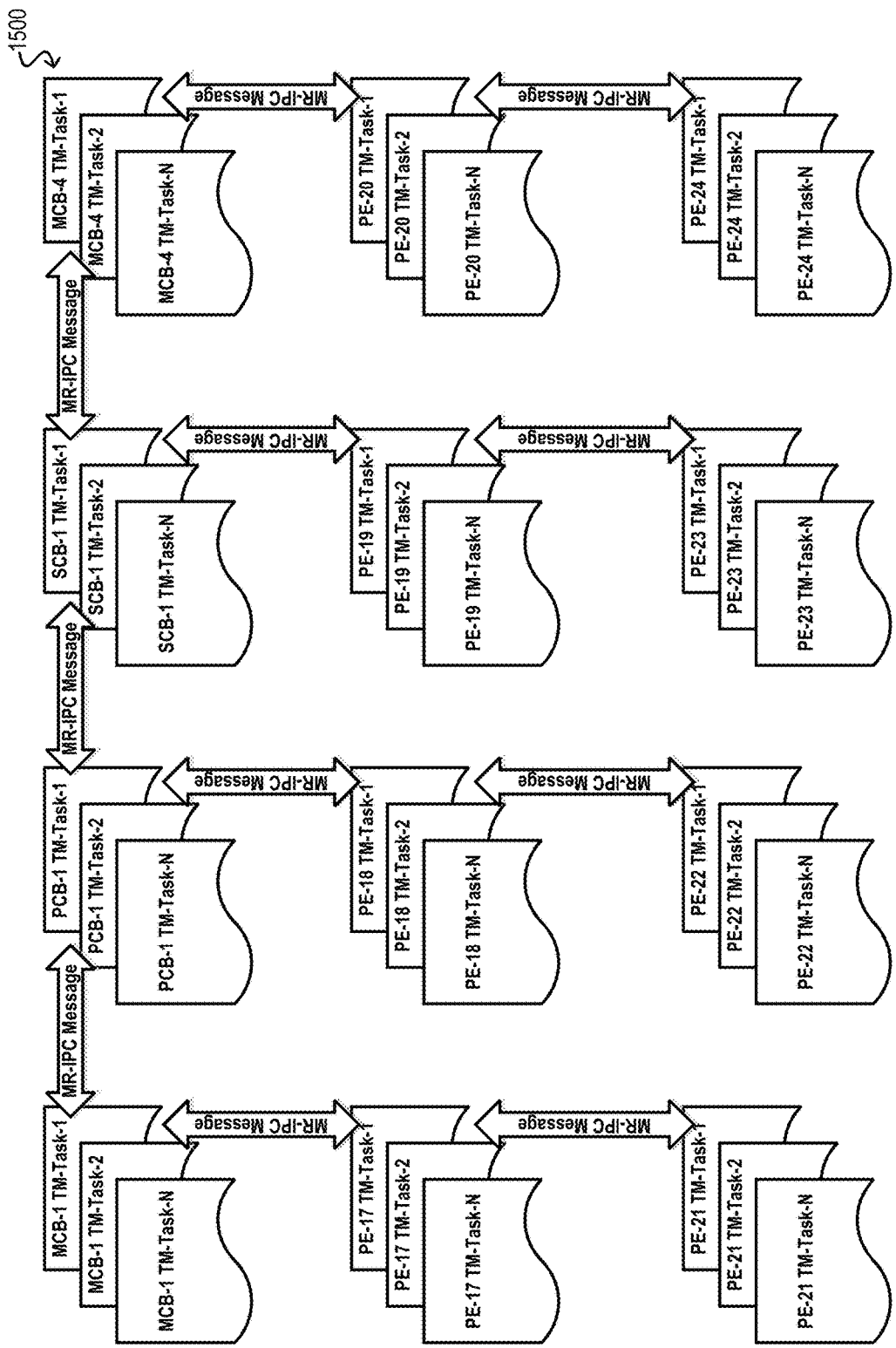
FIG. 15 depicts a multi-instanced transaction manager architecture according to an embodiment.

The DTM can be configured to scale according to various dimensions. For example, to support multiple parallel TM tasks, DTM can implement a multi-instanced architecture in which each transaction is handled by a separate TM instance running on the CBs/PEs. FIG. 15 illustrates a diagram 1500 of this type of multi-instanced TM architecture.

Further, to support transaction message volume and receiver scaling, the following features may be implemented:
- Multicast Bulk-Transfer Support for P2MP Transactions.
- Optimal ACL Tree based single consolidated ACK support for as Transaction Delivery Confirmation to Sender [Master CB] for Large Receiver Group Scaling [IETF RMT Model].
- Optimal NACK Oriented Reliable Multicast [IETF NORM Model] for Large Received Group Scaling of P2MP Transaction Distribution.
- Fabric Replication of P2MP Transaction(s) at Tree Branch-Point(s) for Faster Repair of Missing/Lost Transaction Sequence(s).

Yet further, to support distribution congestion control, the following features may be implemented:
- TCP Friendly Multicast Congestion Control (TFMCC) for PE destination Rate Adaptive, P2MP Transaction Distribution.
- Wave and Equation based Rate Control (WEBRC), i.e. receiver based Congestion Control for massive scaling of large number of receivers of P2MP Transaction Distribution

4.10 Performance of DTM

To improve the performance of DTM, the following features may be implemented:
- Pre-Initialized Free Buffer Pools for Transaction Message Allocation.
- Admission Control of Buffer Pools based on Transaction Channel Priority [Hot-Swap vs. P2MP].
- Buffer Pool Sharing for Incoming Transaction Allocations.
- Reliable Multicast IPC (RM-IPC) for Tree Branch-Point Replication of IPC messages.
- Map RM-IPC over reserved VLAN in SPX Topology with Differentiated-Services Min-BW and Max-BW Metering for guaranteed non-Loss IPC transmission.

5. Distributed Flow Control

As mentioned previously, in an IEEE 802.1BR-based extended bridge, PEs are managed and controlled from a single point-of-management—the master CB in the topology. Thus, for network management provisioning or control purposes, a logical transport connection is established between the master CB and PEs. An end-to-end transport connection has two segments:
- VF connection segment from master CB to member CB that is the root CB device of the PE tree containing the PE device; and
- PE domain connection segment from the root CB to the PE.

This end-to-end transport connection is considered as a single virtualized connection.

Since the master CB is responsible for management and provision/de-provisioning of all configurations of PEs, a high volume of bridge internal traffic carrying network management commands and responses are expected between the master CB and PEs.

This internal traffic demand reaches peak during system startup, or when one or more PE devices are rebooted. Thus for the delivery of this internal traffic to be guaranteed without incurring any message loss, a distributed flow control mechanism is needed both at the transport connection level and in the message queues of relevant application level OS task components, which are running on the host processors of the CB and PE devices.

5.1 Message Buffer Allocation

Free Pools of message buffers or various sizes are created during system startup at every node of the extended virtual bridging network topology.

Client applications use the free buffer pools to allocate Transaction messages. Also the Transaction Manager uses free buffer pools for sending and receiving REL-IPC messages carrying Transaction data, across the routing/switching nodes of the extended virtual bridging network topology. The maximum number of free buffers in a particular type of pool and also the maximum number of free pools of different sizes are configurable via CLI or SNMP.

The free buffer pools can also be configured with availability threshold parameters, e.g. Low Water Mark (LWM) and High Water Mark (HWM), which are expressed as percentage of total free buffer capacity of a Pool. This is to allow Free Buffer Pool management to be more robust and efficient. As the message buffers are allocated and released by various applications during Transaction processing, the current availability of free buffers also fluctuate. Thus when the current free buffer availability reaches LWM, further attempt to allocate a free buffer would fail and the Application is expected to re-attempt allocation after a timeout expiry.

5.2 Distributed Message Queue Admission Control

The message queues used for P2MP and P2P Transactions and also the Transmit and Receive Queues used for REL-IPC message sending and receiving are associated with configurable Threshold parameters, Low Water Mark (LWM) and High Water Mark (HWM), which are expressed as the percentage of total capacity in Bytes for the queue. Thus when a Transaction Queue's current occupancy has already reached the HWM, additional Transaction requests are not accepted. The Client Sender application would receive a failure status indicating Queue Full condition. The Client Sender application is expected to re-attempt submitting the same Transaction after a short timeout.

5.3 Distributed Flow Control Generation

The REL-IPC message queues use configurable values for minimum and maximum queue occupancies. These Minimum and Maximum Queue Occupancy Threshold parameters are configurable on per P2MP Destination Group Address and per Application Layer Channel basis. Similarly the Minimum and Maximum Queue Occupancy Threshold parameters are configurable on per P2P Destination and per Application Layer Channel basis.

At each node inside the extended virtual bridging network topology, the Queue scheduler monitors the Queue occupancy against the Maximum Threshold parameter values, on per Destination and per Application Layer Channel (ALC) basis.

When the current queue occupancy of a specific REL-IPC message queue reaches the configured Maximum Queue Occupancy Threshold parameter value, the Queue is considered full and a Flow Control Message containing the current Queue Occupancy values for each of the REL-IPC Message queue(s) is sent back to the Master CB node.

The corresponding queue is marked as Flow Controlled. Any additional transaction message received for an ALC at a remote destination node, is dropped after the Queue has been marked as Flow Controlled.

When the current Queue occupancy for a Queue falls below the Maximum Threshold, the Flow Controlled status is removed and the Queue is allowed to accept additional REL-IPC messages.

When then Flow-Controlled status is removed for a REL-IPC queue at a Destination PE node or Member-CB node, a Flow Control Reset message is sent back to the Master CB to indicate that the remote destination Node would accept additional REL-IPC messages.

5.4 Distributed Flow Control Processing

The Transaction Manager at the Master CB node upon receiving a Flow Control Set message from any remote destination node, would halt sending any more REL-IPC messages to that destination.

The Transaction Manager at Master CB starts a Delay Time with configurable values for the delay. The Transaction Manager at Master CB would resume sending REL-IPC message for any Transaction to a destination either after the Delay Timer expiry or upon reception of a Flow Control Reset message from the remote Destination.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   monitoring, by a controlling bridge (CB) in an extended bridge, availability of a plurality of port extenders (PEs) in the extended bridge, wherein the monitoring comprises checking for changes in status of inter-process communication (IPC) sessions established between the CB and the plurality of PEs, wherein the changes in status of the IPC sessions indicate whether the plurality of PEs are reachable by the CB;
   in response to the monitoring, detecting, by the CB, a status change of a PE in the plurality of PEs;
   identifying, by the CB, one or more rule contexts associated with the PE; and
   for each rule context in the one or more rule contexts:
      determining, by the CB for the rule context, one or more packet classification rules to be programmed on the PE; and
      transmitting, by the CB, a message identifying the one or more packet classification rules to the PE.

2. The method of claim 1 wherein the status change indicates that the PE has newly joined the extended bridge.

3. The method of claim 1 wherein the status change indicates that the PE has been rebooted.

4. The method of claim 1 wherein each of the one or more rule contexts is associated with a network service or protocol running on the CB.

5. The method of claim 4 wherein determining, for the rule context, one or more packet classification rules to be programmed on the PE comprises:
   invoking a callback API exposed by the network service or protocol associated with the rule context.

6. The method of claim 5 wherein the callback API is configured to perform a walk of a tuple space of packet classification rules.

7. The method of claim 1 further comprising:
   synchronizing, to a standby CB, state information regarding packet classification rules that are in process of being distributed to the plurality of PEs in the extended bridge.

8. A non-transitory computer readable storage medium having stored thereon program code executable by a controlling bridge (CB) in an extended bridge, the program code causing the CB to:
   monitor availability of a plurality of port extenders (PEs) in the extended bridge, wherein the monitoring comprises checking for changes in status of inter-process communication (IPC) sessions established between the CB and the plurality of PEs, and wherein the changes in status of the IPC sessions indicate whether the plurality of PEs are reachable by the CB;

in response to the monitoring, detect a status change of a PE in the plurality of PEs;

identify one or more rule contexts associated with the PE; and for each rule context in the one or more rule contexts:
    determine, for the rule context, one or more packet classification rules to be programmed on the PE; and
    transmit a message identifying the one or more packet classification rules to the PE.

9. The non-transitory computer readable storage medium of claim 8 wherein the status change indicates that the PE has newly joined the extended bridge.

10. The non-transitory computer readable storage medium of claim 8 wherein the status change indicates that the PE has been rebooted.

11. The non-transitory computer readable storage medium of claim 8 wherein each of the one or more rule contexts is associated with a network service or protocol running on the CB.

12. The non-transitory computer readable storage medium of claim 11 wherein determining, for the rule context, one or more packet classification rules to be programmed on the PE comprises:
    invoking a callback API exposed by the network service or protocol associated with the rule context.

13. The non-transitory computer readable storage medium of claim 12 wherein the callback API is configured to perform a walk of a tuple space of packet classification rules.

14. The non-transitory computer readable storage medium of claim 8 wherein the program code further causes the CB to:
    synchronize, to a standby CB, state information regarding packet classification rules that are in process of being distributed to the plurality of PEs in the extended bridge.

15. A controlling bridge (CB) in an extended bridge, the CB comprising:
    a processor; and
    a non-transitory computer readable medium having stored thereon program code that, when executed by the processor, causes the processor to:
        monitor availability of a plurality of port extenders (PEs) in the extended bridge, wherein the monitoring comprises checking for changes in status of inter-process communication (IPC) sessions established between the CB and the plurality of PEs, and wherein the changes in status of the IPC sessions indicate whether the plurality of PEs are reachable by the CB;
        in response to the monitoring, detect a status change of a PE in the plurality of PEs;
        identify one or more rule contexts associated with the PE; and
        for each rule context in the one or more rule contexts:
            determine, for the rule context, one or more packet classification rules to be programmed on the PE; and
            transmit a message identifying the one or more packet classification rules to the PE.

16. The CB of claim 15 wherein the status change indicates that the PE has newly joined the extended bridge.

17. The CB of claim 15 wherein the status change indicates that the PE has been rebooted.

18. The CB of claim 15 wherein each of the one or more rule contexts is associated with a network service or protocol running on the CB.

19. The CB of claim 18 wherein determining, for the rule context, one or more packet classification rules to be programmed on the PE comprises:
    invoking a callback API exposed by the network service or protocol associated with the rule context.

20. The CB of claim 19 wherein the callback API is configured to perform a walk of a tuple space of packet classification rules.

21. The CB of claim 15 wherein the program code further causes the processor to:
    synchronize, to a standby CB, state information regarding packet classification rules that are in process of being distributed to the plurality of PEs in the extended bridge.

* * * * *